United States Patent [19]
Li et al.

[11] Patent Number: 5,912,762
[45] Date of Patent: Jun. 15, 1999

[54] THIN FILM POLARIZING DEVICE

[76] Inventors: Li Li, 2041-204B Arrowsmith, Gloucester, Ontario, Canada, K1J 7V7; Jerzy A. Dobrowolski, 2691 Traverse Drive, Ottawa, Ontario, Canada, K1V 8B6

[21] Appl. No.: 08/694,415

[22] Filed: Aug. 12, 1996

[51] Int. Cl.$^6$ .................................... G02B 5/30
[52] U.S. Cl. .................... 359/352; 359/495; 359/498; 359/583
[58] Field of Search ................. 359/485, 487, 359/488, 490, 494, 495, 496, 497, 498, 583, 584, 839, 486, 580, 589, 352

[56] References Cited

U.S. PATENT DOCUMENTS

| | | | |
|---|---|---|---|
| 2,359,694 | 10/1944 | Turner | 359/487 |
| 2,403,731 | 7/1946 | MacNeille | 359/583 |
| 2,601,806 | 7/1952 | Turner | 359/583 |
| 3,026,763 | 3/1962 | Marks | 359/488 |
| 4,084,883 | 4/1978 | Eastman et al. | 359/487 |
| 4,221,464 | 9/1980 | Pedinoff et al. | 359/486 |
| 4,733,926 | 3/1988 | Title | 359/352 |
| 5,157,526 | 10/1992 | Kondo et al. | 359/488 |
| 5,309,422 | 5/1994 | Kuroki et al. | 359/487 |
| 5,466,564 | 11/1995 | Blazey et al. | 359/489 |

FOREIGN PATENT DOCUMENTS

| | | | |
|---|---|---|---|
| 0137317 | 10/1981 | Japan | 359/487 |

*Primary Examiner*—Ricky D. Shafer
*Attorney, Agent, or Firm*—Neil Teitelbaum Associates

[57] ABSTRACT

A thin film polarizing device has first and second light transmissive substrates in the form of prisms and a plurality of thin film layers disposed between the prisms. The thin film layers and have predetermined thicknesses and refractive indices which allow unpolarized incident light to be separated into s-polarized and p-polarized light beams. Both frustrated total internal reflection and thin film interference are simultaneously employed to allow s-polarized light to be transmitted and p-polarized light to be reflected over a wide range of wavelengths and angles of incidence. The polarizing device may be used as a polarizer or a polarizer beam splitter.

17 Claims, 37 Drawing Sheets

THIN FILM POLARIZING DEVICE

FIELD OF THE INVENTION

This invention relates to a thin film device and more particularly relates to a thin film polarizing device for separating s-polarized light and p-polarized light. The thin film polarizing device can be a polarizing beam-splitter or a polarizer. In a polarizing beam-splitter both the transmitted and the reflected polarized light beams are utilized and are equally important. In a polarizer, only the transmitted or reflected polarized beam is used and the other beam is not required. Thus, the polarizing beam-splitter can always be used as a polarizer, but the reverse is not necessarily true.

BACKGROUD OF THE INVENTION

Polarizers and polarizing beam-splitters are essentially commonplace optical components and are currently widely used in optical instruments, lasers, electro-optic displays, optical recording and in the fabrication of other optical components. There are several parameters that can be used to describe the performance of a polarizer or polarizing beam-splitter. These parameters are: the wavelength range over which the polarizer or polarizing beam-splitter is effective, the angular field of the incident light in which the polarizer or polarizing beam-splitter is effective and the extinction ratio of the desired polarized light to the unwanted polarized light after the light passes through a polarizer or polarizing beam-splitter.

Commonly available polarizers and polarizing beam-splitters can be divided into several types that depend upon different physical principles: pile-of-plates polarizers, reflection polarizers, Polaroid sheet polarizers, polarizers based on birefringent crystals, metallic grid polarizers, and thin film interference polarizers.

Pile-of-plates polarizers are comprised of parallel transparent plates that are placed in series and they are mainly used in the ultraviolet and infrared parts of the spectrum. Normally, light is incident at each interface at the Brewster angle such that all the p-polarized light and only some of the s-polarized light is transmitted. If a sufficient number of such plates are placed in series, the transmitted light can be highly polarized and have a high extinction ratio. Although these polarizers act over a very broad spectral region, their angular field is limited.

Reflection polarizers are based on a similar principle but use light reflected from one or more surfaces to polarize a light beam. One advantage of this polarizer is that its performance is independent the wavelength. However, its performance is very sensitive to the angle of the incident beam. An additional complication is that the reflected light propagates in a different direction from that of the incident light.

Polaroid polarizers are both wide-angle and broad-band and are based on the absorption of light of one polarization. They can be very thin and are convenient to use. They are made of plastic and can be produced in large sizes and at low cost. However, at least 50% of light is lost by absorption in these polarizers and the extinction ratio is not very high. Therefore, these polarizers are typically used in low power applications in which damage to the device due to light absorption is not a concern.

Polarizers based on birefringent materials also perform well over a broad band of wavelengths and a wide range of angles. These polarizers are based on the total internal reflection of light in birefringent crystals. Normally these polarizers are comprised of two birefringent crystal prisms that are in contact with each other. The optical axes of the two prisms are arranged in such a way that the refractive indices at both sides of the contact surface are the same for the ordinary light (polarized in one direction) and are higher in the first prism and lower in the second prism for the extraordinary light (polarized in the other direction), or vice versa. When unpolarized light is incident upon the interface between the two prisms and if the angle of incidence is larger than the critical angle for the extraordinary light, the ordinary light will be substantially transmitted while the extraordinary light will be totally reflected. Therefore, a very high extinction ratio is achieved. Many different arrangements for such polarizers exist. However this type of polarizer is costly and cannot be made in large sizes because of the limited availability of birefringent crystal materials.

Metallic grid polarizers transmit light whose electric field vector is parallel to the grid lines and reflect light whose electric field vector is perpendicular to the grid lines. These polarizers are effective over a wide spectral region and a wide range of angles. However, because of the difficulty of making large grids of very small spacings, their use is confined to the infrared or longer wavelengths.

Multilayer thin film plate polarizers basically consist of quarterwave layers and generally have a high extinction ratio. Unfortunately, they operate over a narrow spectral region and have a small angular field. Another type of thin film polarizers invented by MacNeille (U.S. Pat. No. 2,403, 731). makes use of the Brewster angle. MacNeille polarizers are comprised of thin films embedded between two prisms and their extinction ratio increases with the number of layers. MacNeille polarizers operate over a very broad spectral region, but are only effective over a very narrow range of angles, usually the angular field measured in air is of the order of ±3°. In addition, the extinction ratios for the reflected and transmitted beams are different. There is some contamination of s-polarized light in the transmitted p-polarized light. Mouchart et. al, in a paper entitled "Modified MacNeille cube polarizers for a wide angular field," Appl. Opt. 28, 2847 (1989), have shown that it is possible to broaden the angular field of MacNeille polarizers, but only at the expense of reducing the width of the spectral region over which they are effective.

D. Lees and P. Baumeister, in a paper entitled "Versatile frustrated-total-reflection polarizer for the infrared," Opt. Lett. 4, 66 (1979) describe a thin film infrared polarizer based on the principle of frustrated total internal reflection Fabry-Perot filters. In this device a high refractive index spacer layer is sandwiched between two low refractive index layers to form an etalon that is deposited onto the surface of a germanium prism. The light is incident at an angle that is greater than the critical angle—one that is chosen in such a way that the phase difference between s- and p-polarized light is 180°. Therefore, if the Fabry-Perot etalon condition is satisfied for the p-polarization, all the p-polarized light will be transmitted while the s-polarized light is reflected, and vice versa. The phase difference between the s-polarized and p-polarized light depends on the refractive index of the substrate and the angle of incidence. Because of the limited range of refractive indices of materials for the visible part of the spectrum, such polarizers can only be constructed for the infrared. Furthermore, because these polarizers are essentially narrow band filters, the band-width is small. Another disadvantage of these polarizers is that they also have a small angular field. This is because the phase change on reflection and the optical thickness of the spacer layer change with angle in opposite directions.

It is therefore an object of this invention to provide a broad-band and wide-angle thin film polarizing device that has a large wavelength ratio of the order of 50:1 and a large angular field of the order of ±45° in air. The thin film polarizing device can operate in the ultraviolet, visible, infrared and microwave spectral regions.

It is yet another object of this invention to provide a broad-band and wide-angle thin film polarizing device that has a high extinction ratio for both reflected and transmitted polarized light.

It is yet another object of this invention to provide a broad-band and wide-angle thin polarizing device that is non-absorbing and durable both chemically and physically.

SUMMARY OF THE INVENTION

In accordance with the invention, there is provided, a thin film polarizing device comprising first and second light transmissive substrates, a plurality of thin film layers disposed between the first and second light transmissive substrates. The thin film layers are designed to allow unpolarized incident light to be separated into s-polarized and p-polarized light beams. Frustrated total internal reflection and thin film interference are simultaneously employed to allow s-polarized light to be transmitted and p-polarized light to be reflected over a wide range of wavelengths and angles of incidence.

In accordance with the invention, there is further provided, a thin film polarizing device, for separating s-polarized light and p-polarized light by reflecting p-polarized light and transmitting s-polarized light. The device comprises first and second light transmissive substrates; and, a plurality of thin film layers disposed between the first and second light transmissive substrates. The thin film layers comprise high refractive index layers and low refractive index layers, the high refractive index layers having one or more different refractive indices, and the low refractive index layers having one or more different refractive indices; the first and second light transmissive substrates, each in the form of a prism having a refractive index greater than the refractive index of each of the low refractive index layers; the prisms being shaped in such a manner as to allow the incident light to be incident upon the thin film layers at a plurality of angles greater than or equal to the critical angle for the highest refractive index of the low refractive index layers; the thickness of the low refractive index layers of the plurality of thin film layers being small enough so that light incident upon the thin film layers at an angle greater than the critical angle can be partially coupled out through the low refractive index layers such that frustrated total internal reflection occurs, thus permitting interference to take place between the light reflected at the interfaces of all the thin film layers, and in addition, the thicknesses of the thin film layers being such that the equivalent optical admittance of the plurality of the thin film layers for s-polarized light is substantially the same as the optical admittance of the substrate for s-polarized light for a wide range of angles of incidence and a broad band of wavelengths when the incident light is incident upon the low refractive index layers at an angle greater that the critical angle, thereby allowing substantially all the incident s-polarized light to be substantially transmitted; the plurality of the thin film layers having an equivalent optical admittance for p-polarized light that is substantially different from the optical admittance of the substrate for p-polarized light for a wide-range of angles of incidence and a broad-band of wavelengths and thus substantially reflecting all the incident p-polarized light.

This invention provides a novel approach to the design of very broad band (wavelength ratios as large as 50:1), very wide angular field (up to ±61° in the infrared) thin film polarizing device. These thin film polarizing devices are based on frustrated total internal reflection. However, the design approach is very different from prior art approaches and permits polarizers with varying performance specifications to be produced for the ultraviolet, visible, infrared, far-infrared to the microwave spectral regions.

DETAILED DESCRIPTION

The present invention and exemplary embodiments of the invention will be described in accordance to the following drawings in which.

Figure 8:
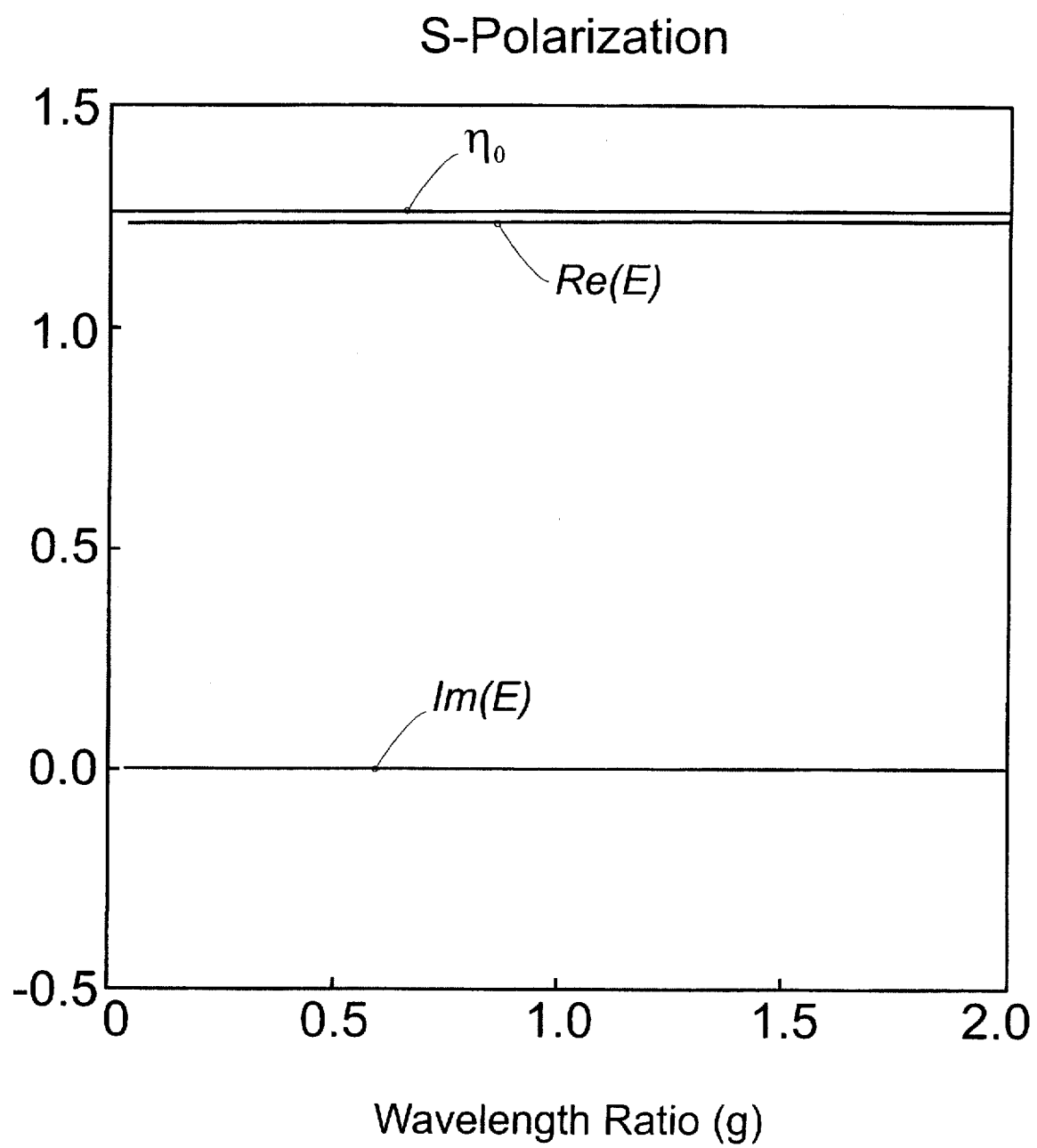
FIG. 8 shows the real and imaginary parts of the equivalent optical admittance of a basic symmetrical three-layer structure and the optical admittance of the substrate as a function of wavelength ratio for s-polarized light.
Figure 9:
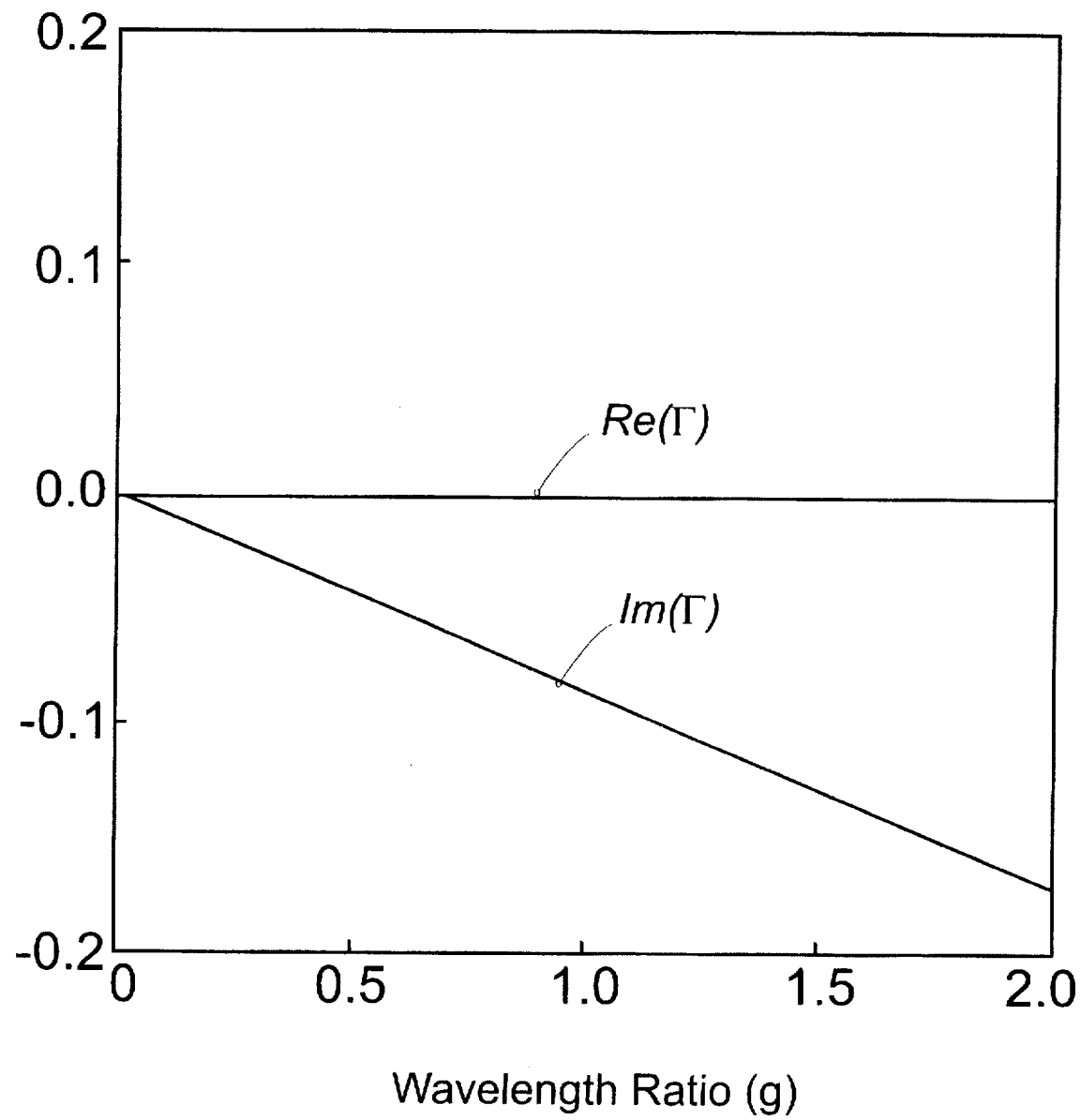
FIG. 9 shows the real and imaginary parts of the equivalent phase thickness of the same basic structure as in FIG. 8 for s-polarized light.
Figure 16:
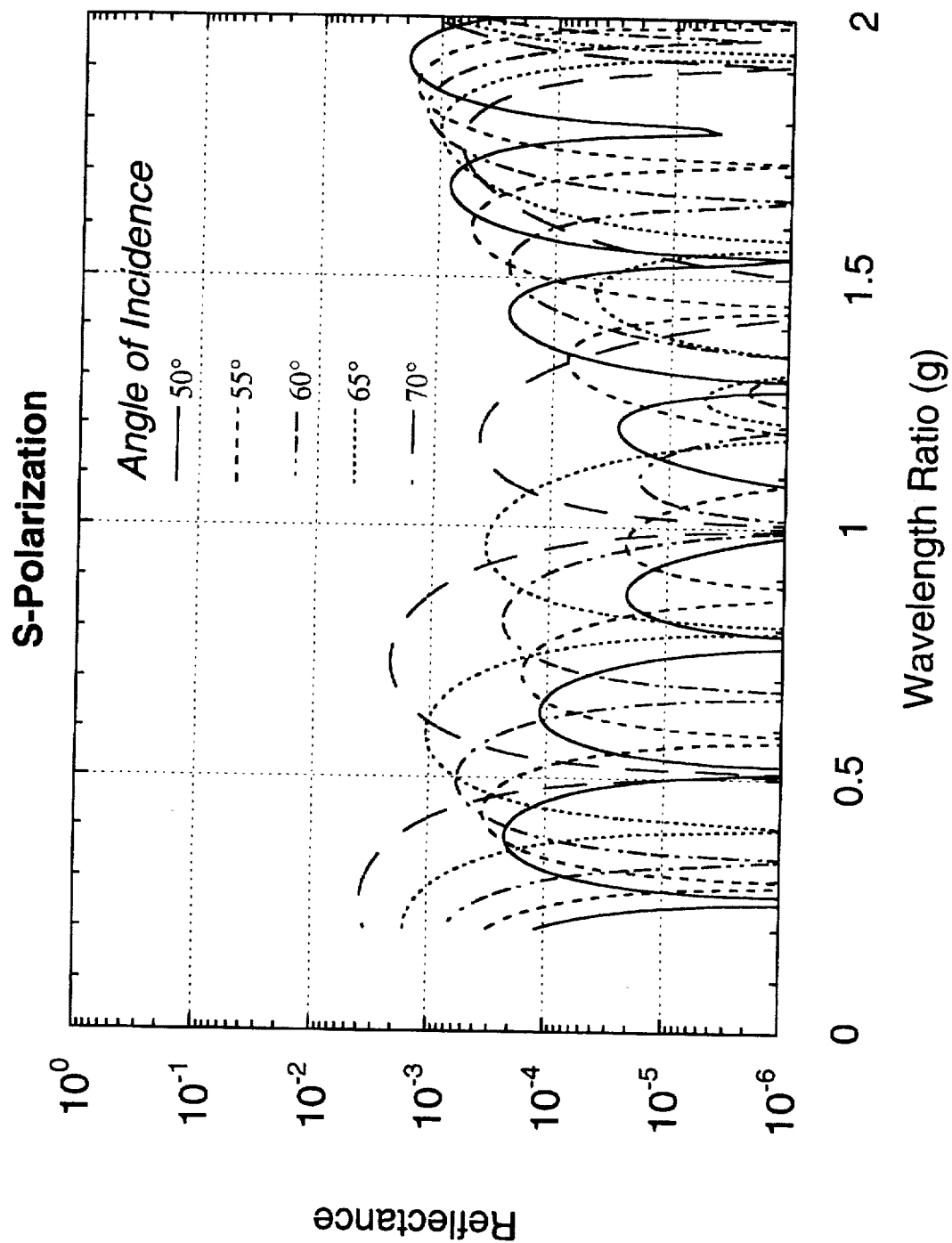
Figure 17:
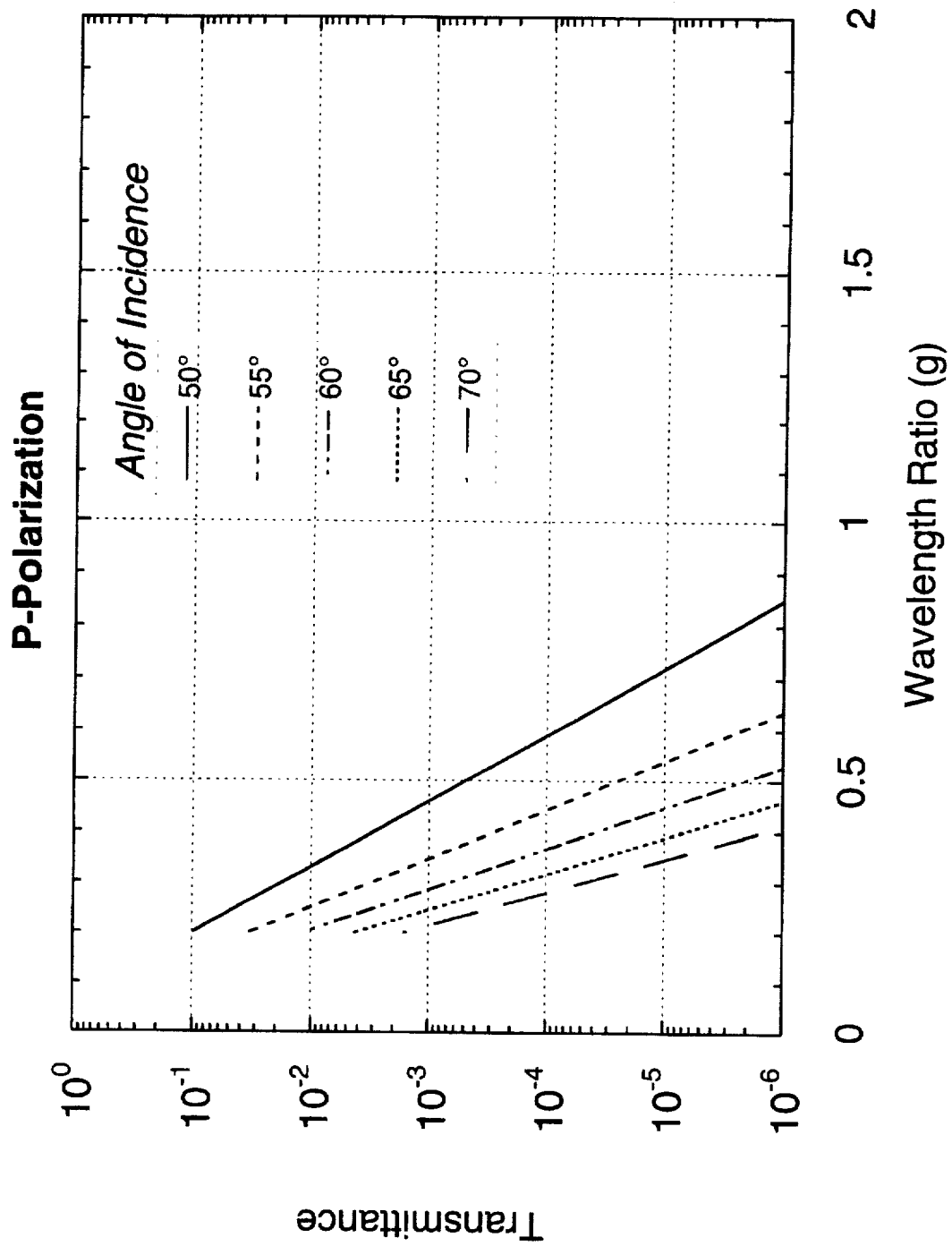
Figure 18:
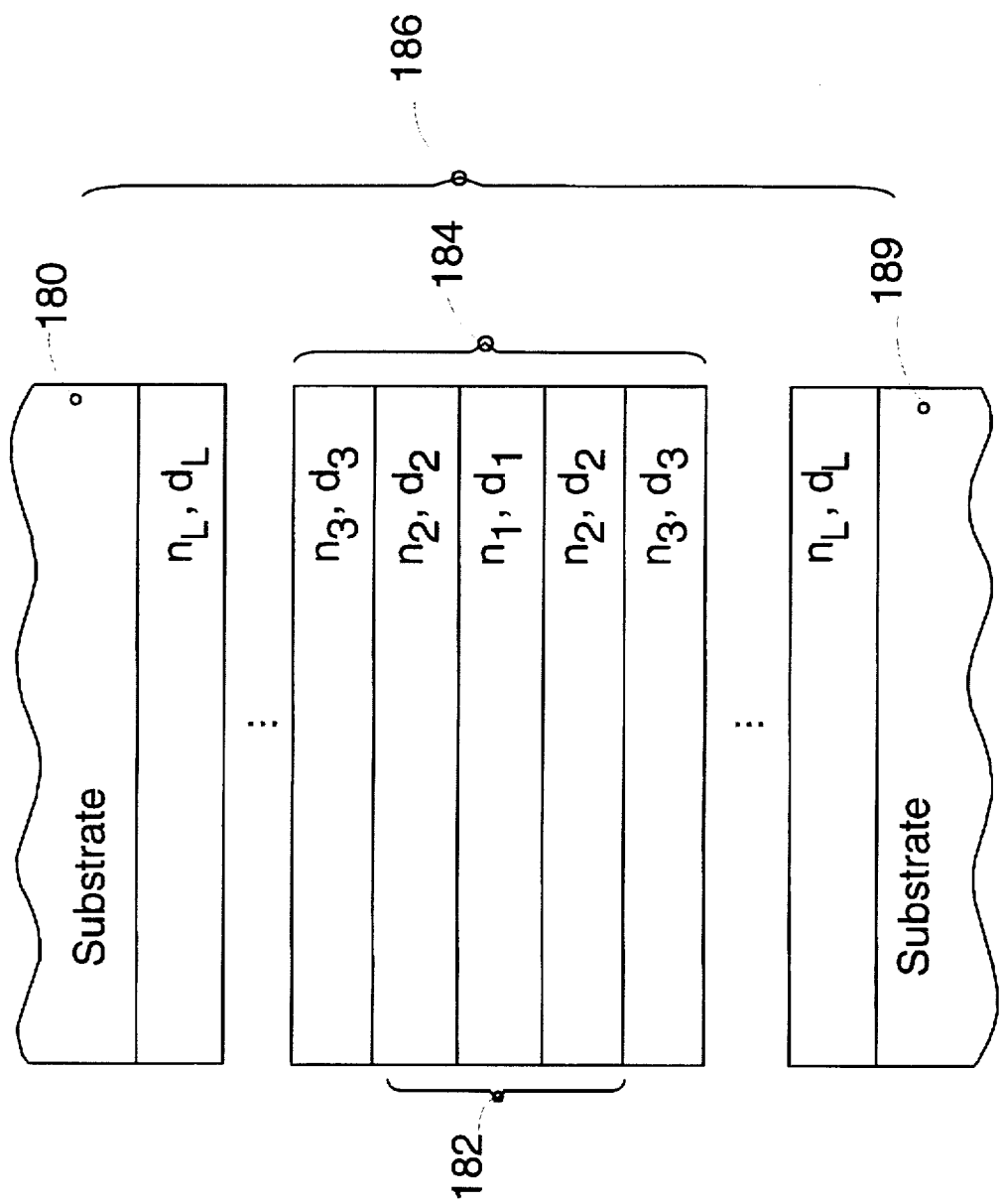
Figure 19:
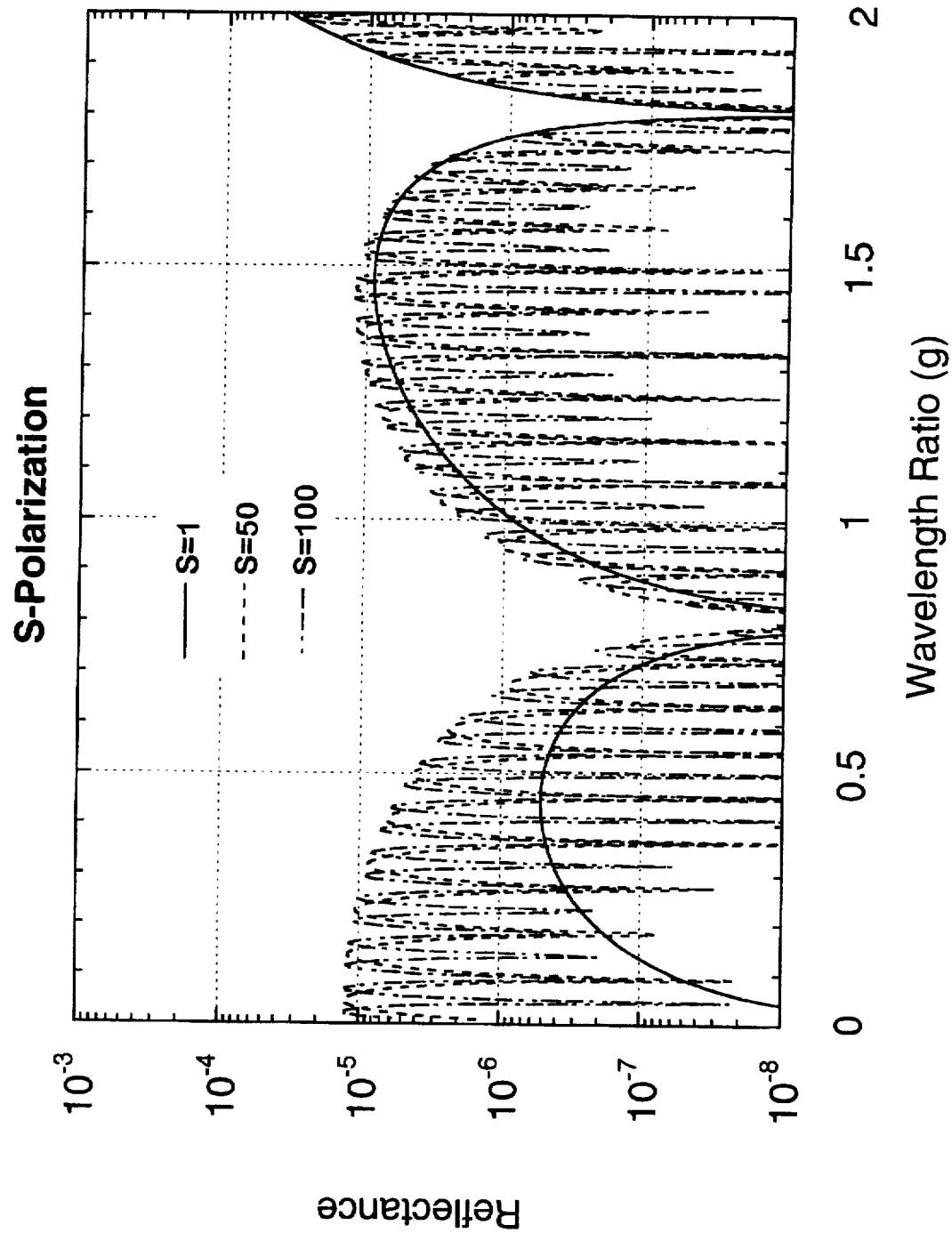
Figure 20:
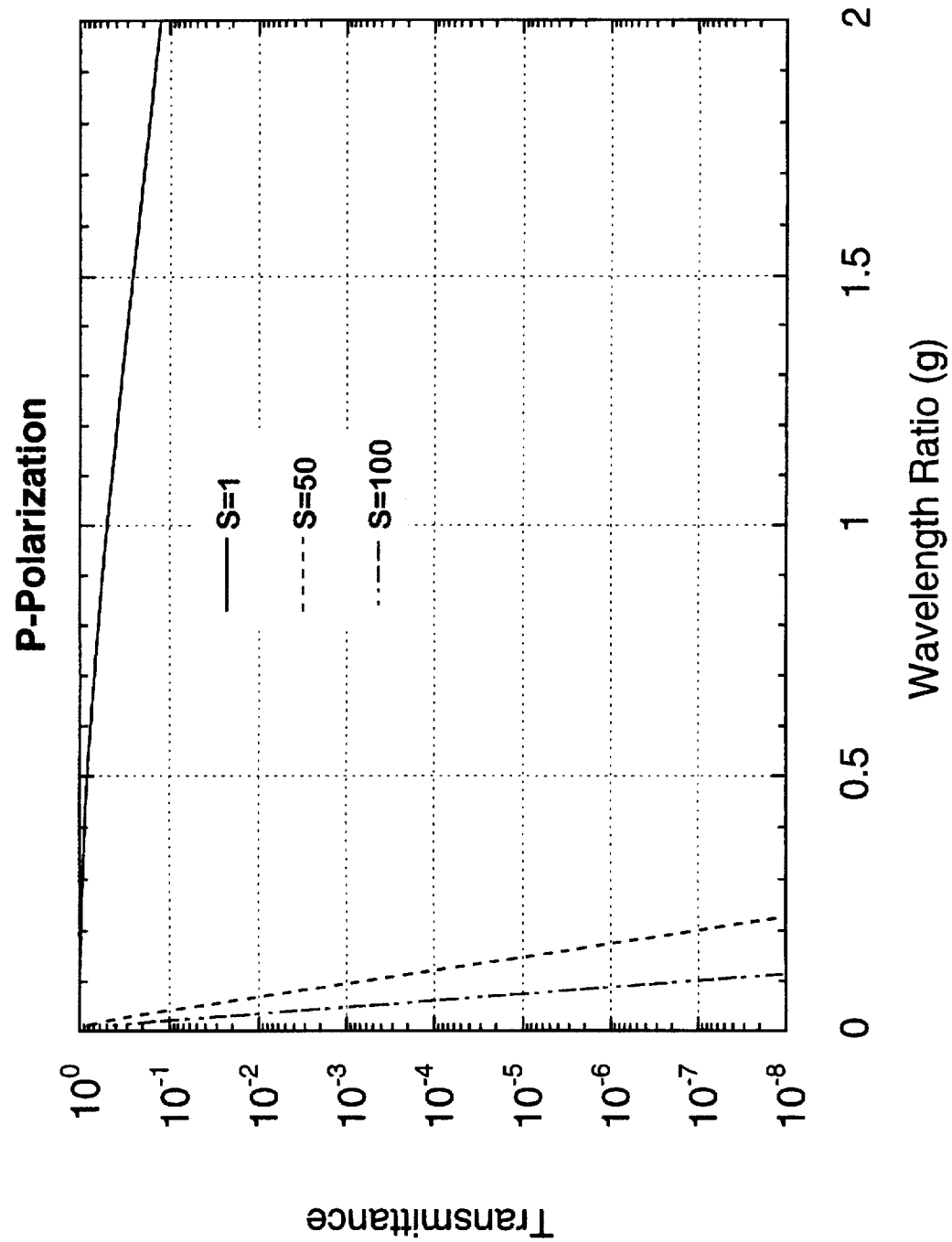

FIG. 16 shows the calculated reflectance curves for s-polarized light as a function of wavelength ratio for a thin film system having 40 periods of the basic structure as in FIG. 8. The angles of incidences are 50°, 55°, 60°, 65° and 70°;

FIG. 17 shows the calculated transmittance curves for p-polarized light as a function of wavelength ratio for the same thin film system as in FIG. 16. The angles of incidences are 50°, 55°, 60°, 65° and 70°;

FIG. 18 is a cross-sectional view of an extended basic symmetrical thin film structure having (2L-1) layers, L is larger than 1;

FIG. 19 shows the calculated reflectance curves for s-polarized light as a function of wavelength ratio for thin film systems having 1, 50 and 100 periods of a five-layer basic structure. The angle of incidence $\theta_0$ is 57.3°;

FIG. 20 shows the calculated transmittance curves for p-polarized light as a function of wavelength ratio for the same thin film systems as shown in FIG. 19. The angle of incidence $\theta_0$ is 57.3°.

Figure 21:
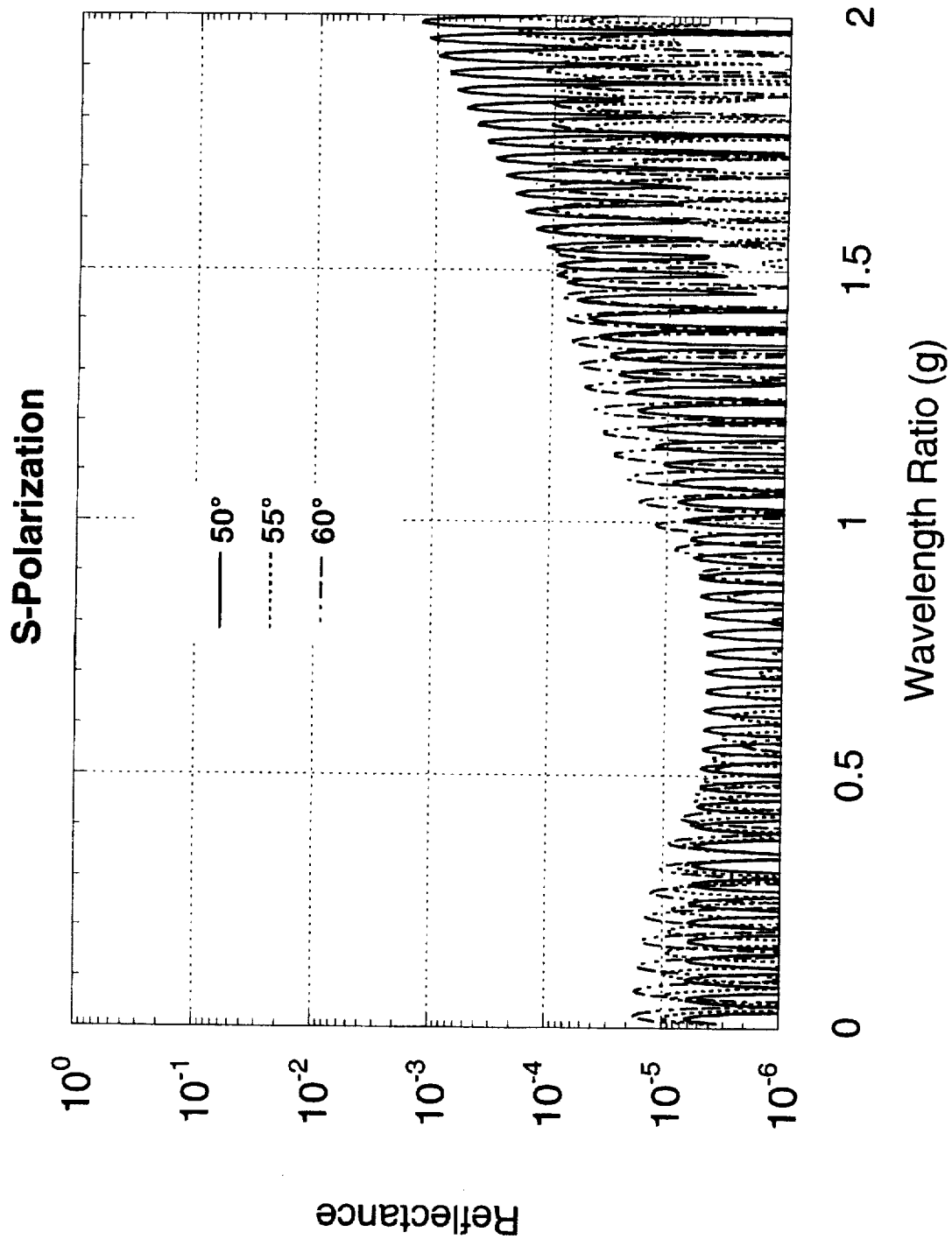
Figure 22:
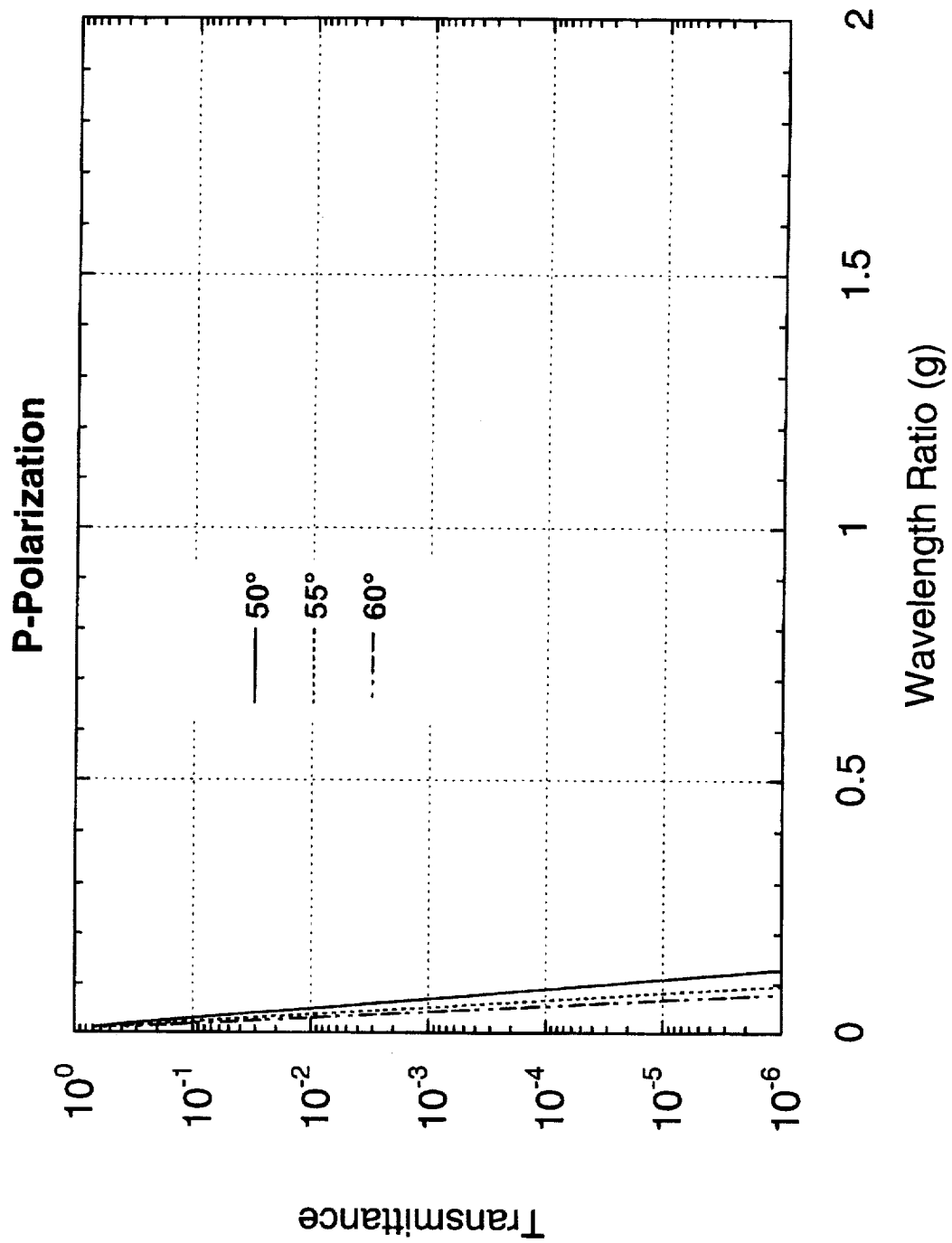
Figure 23:
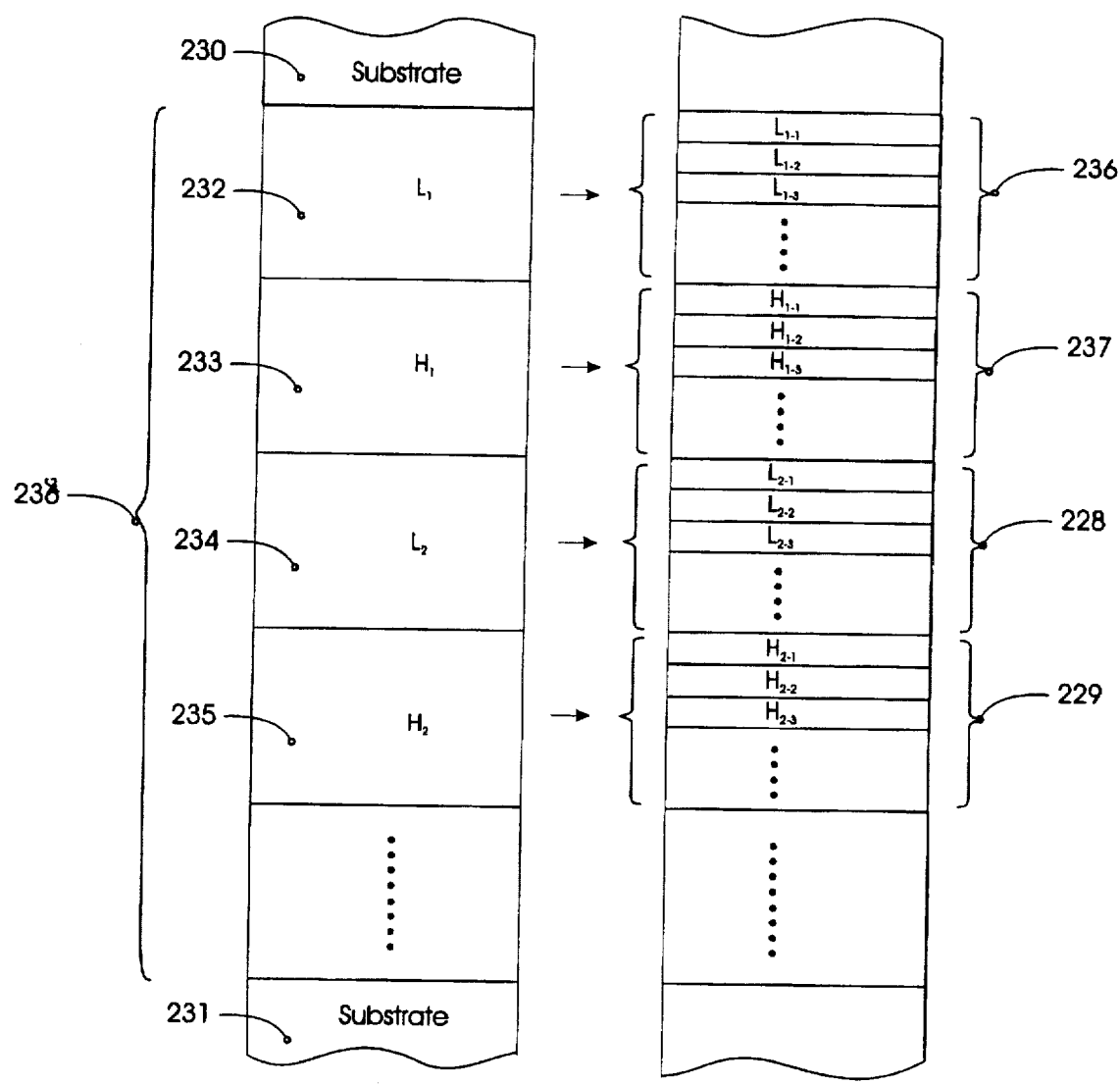
Figure 24:
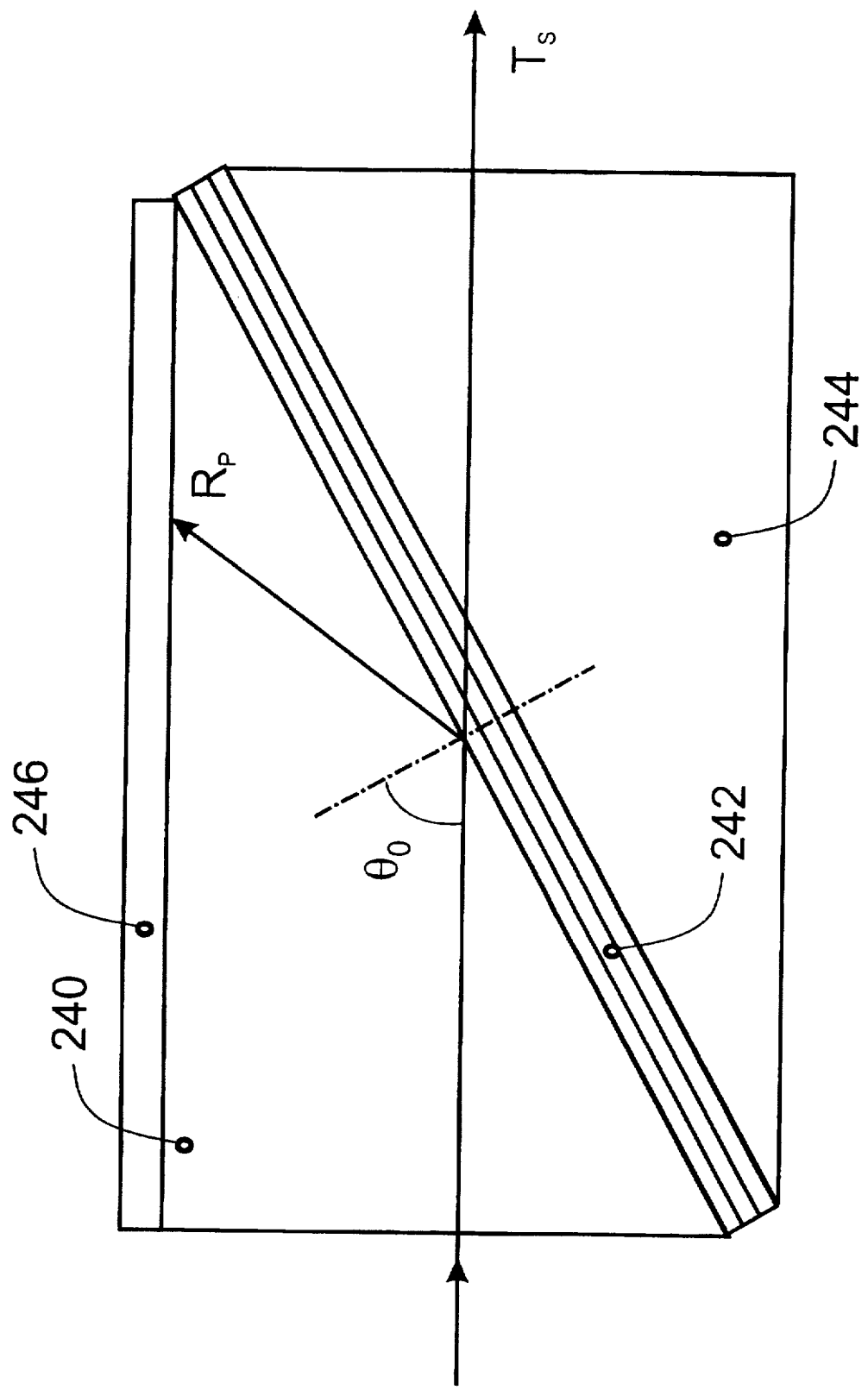
Figure 25:
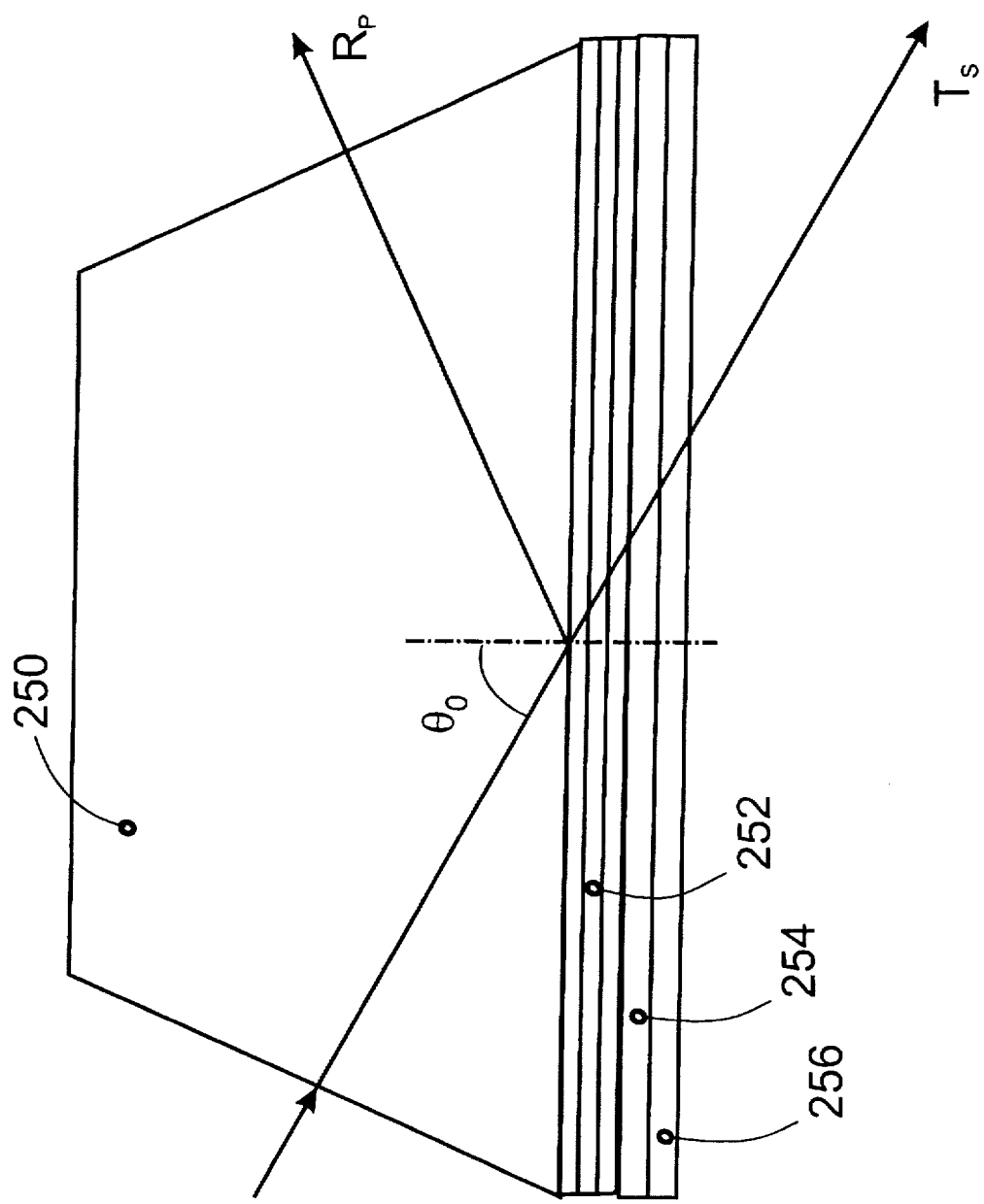
Figure 26:
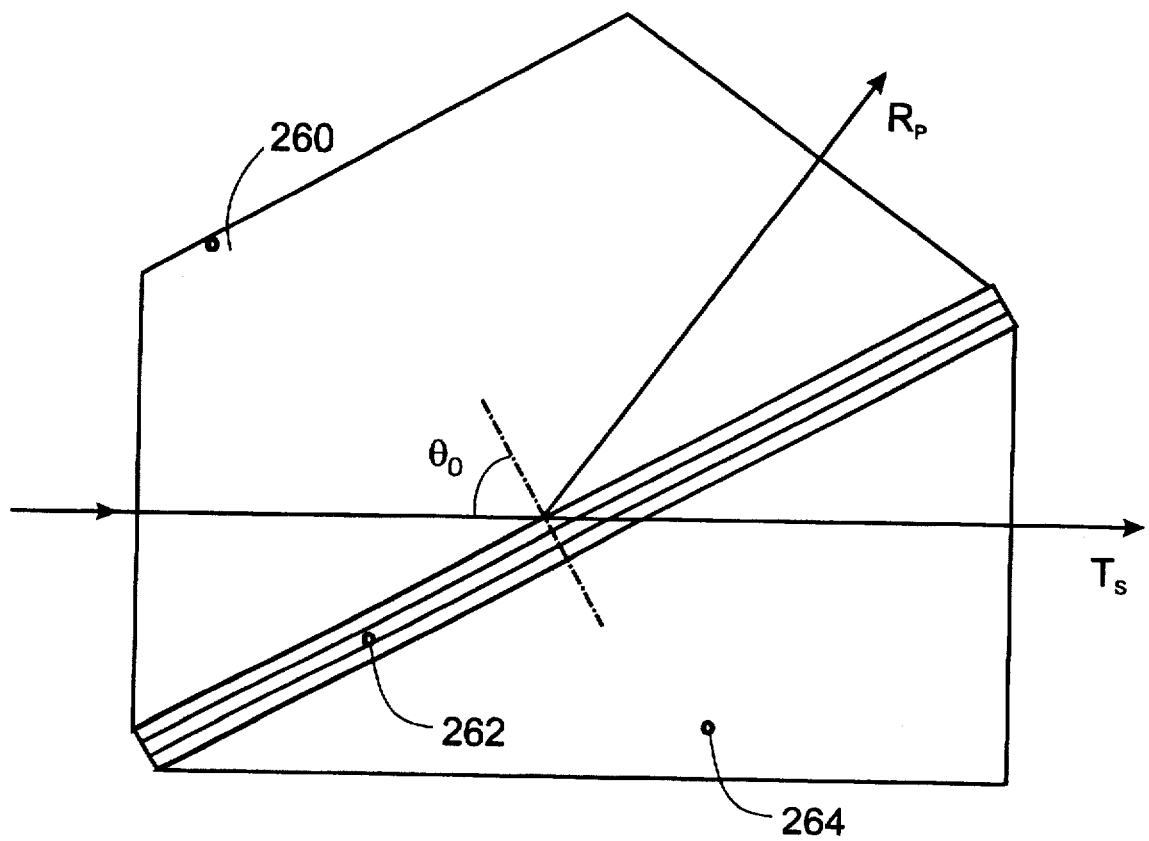
Figure 27:
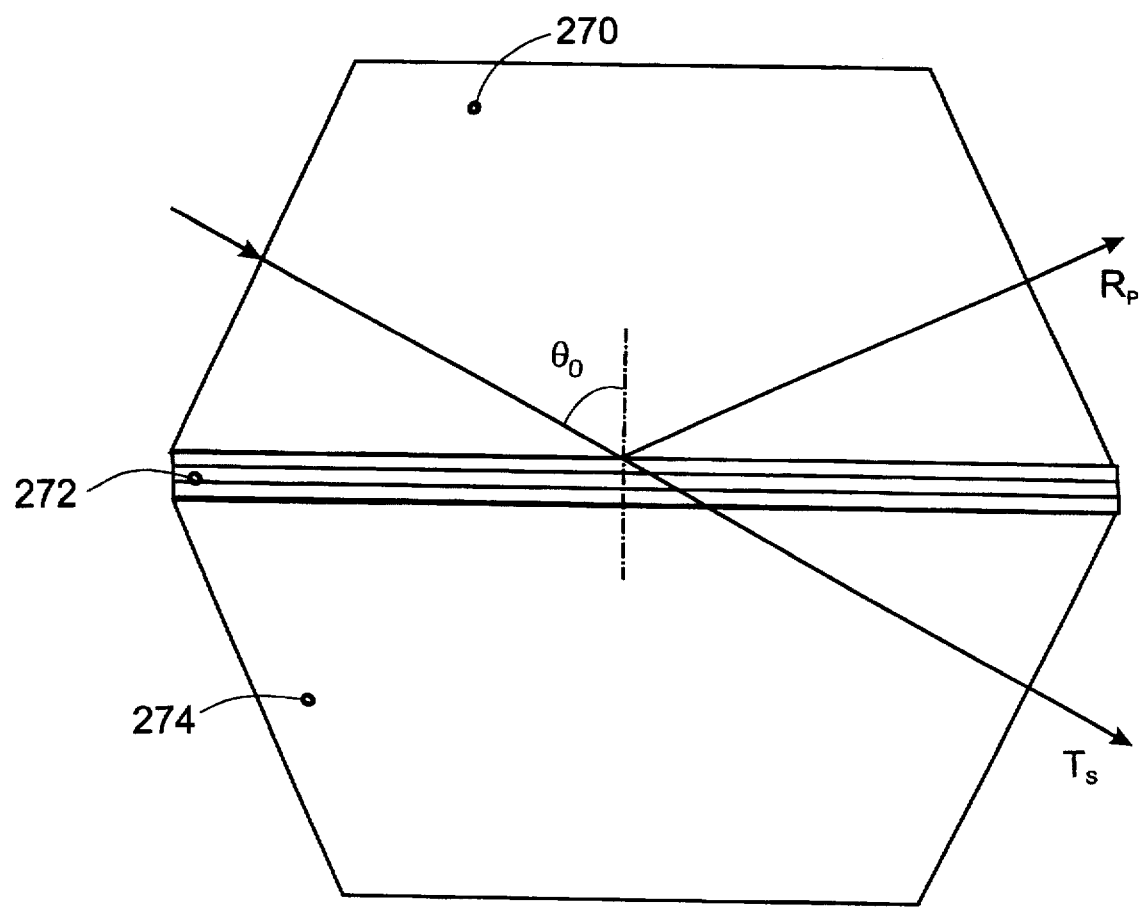
Figure 28:
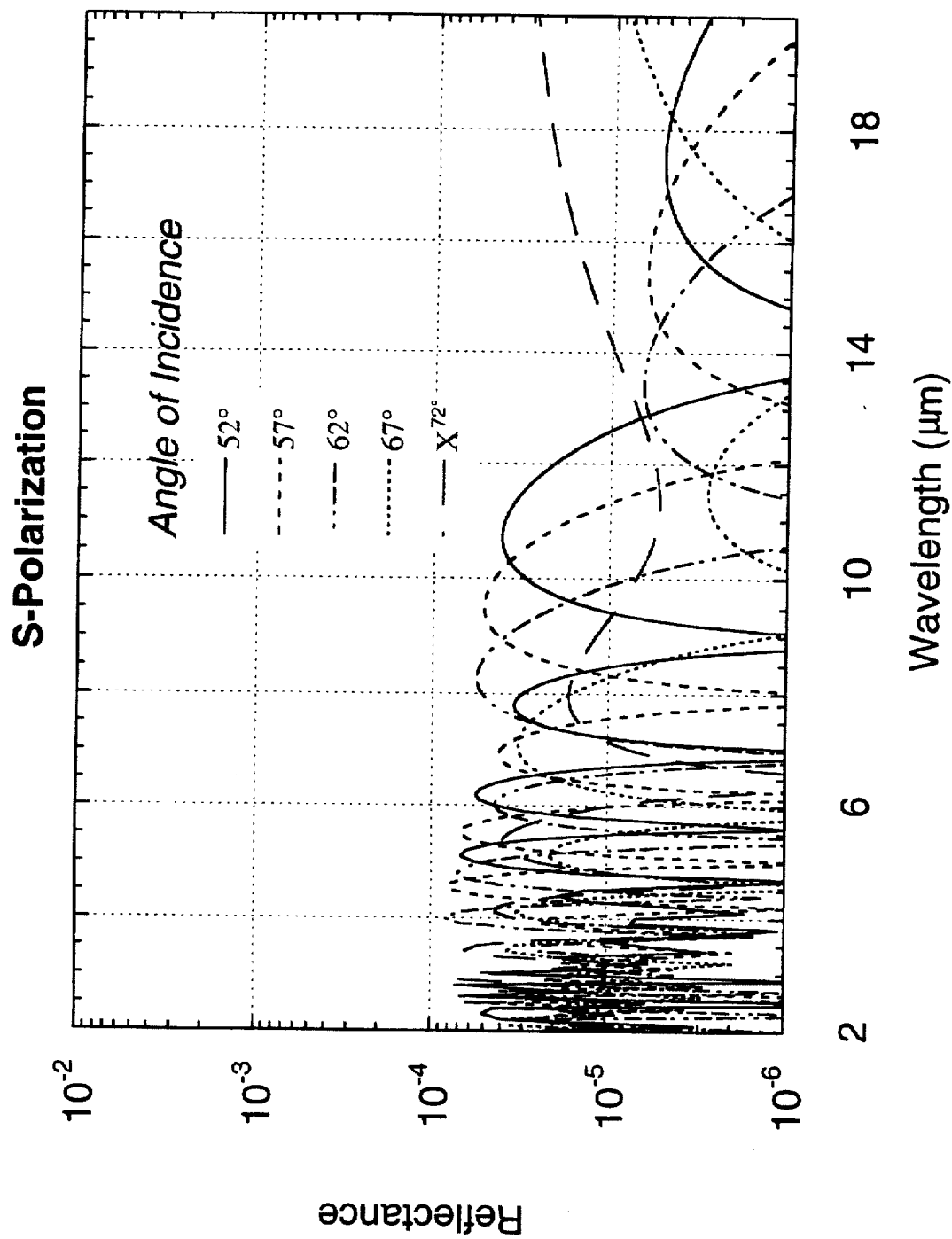
Figure 29:
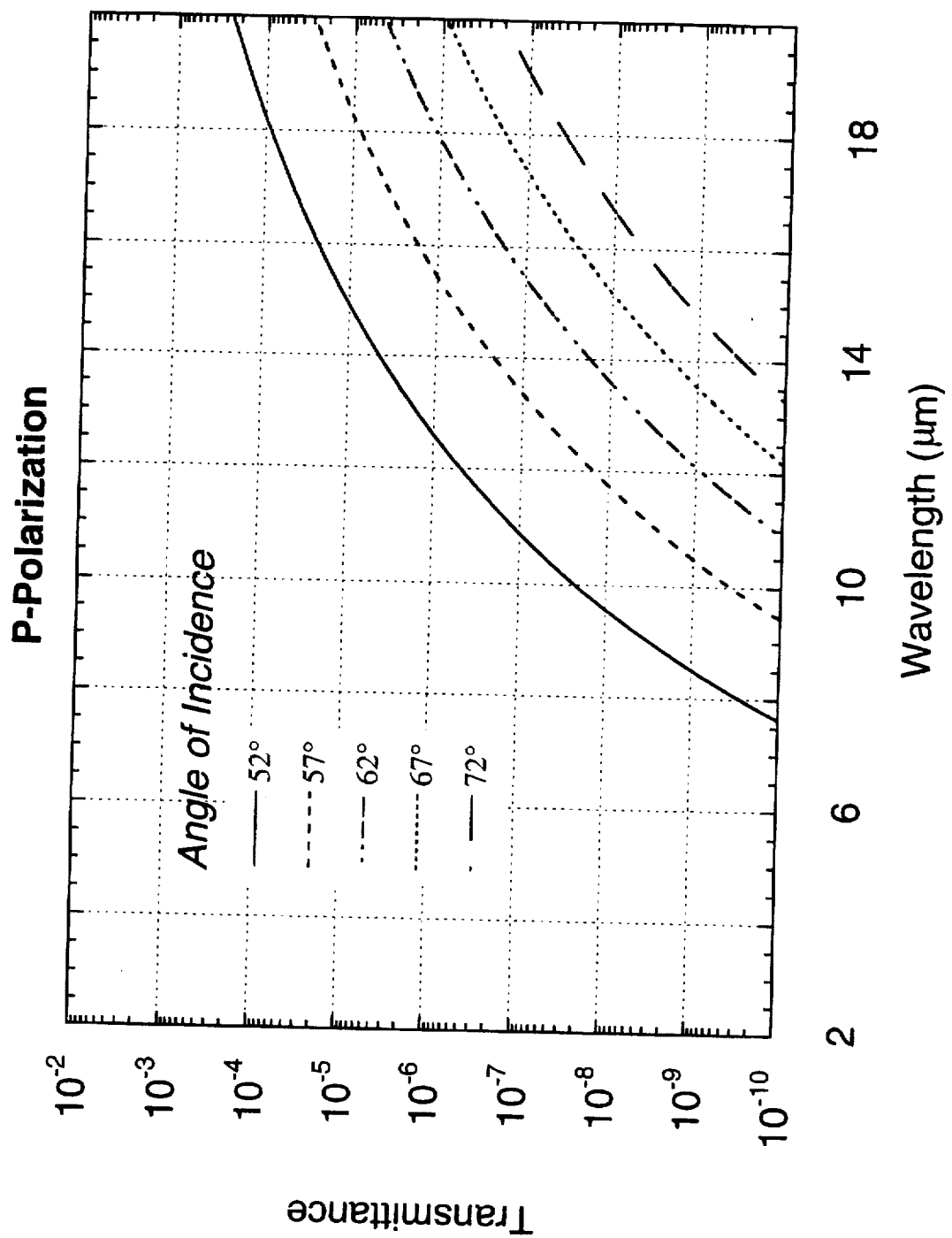
Figure 30:
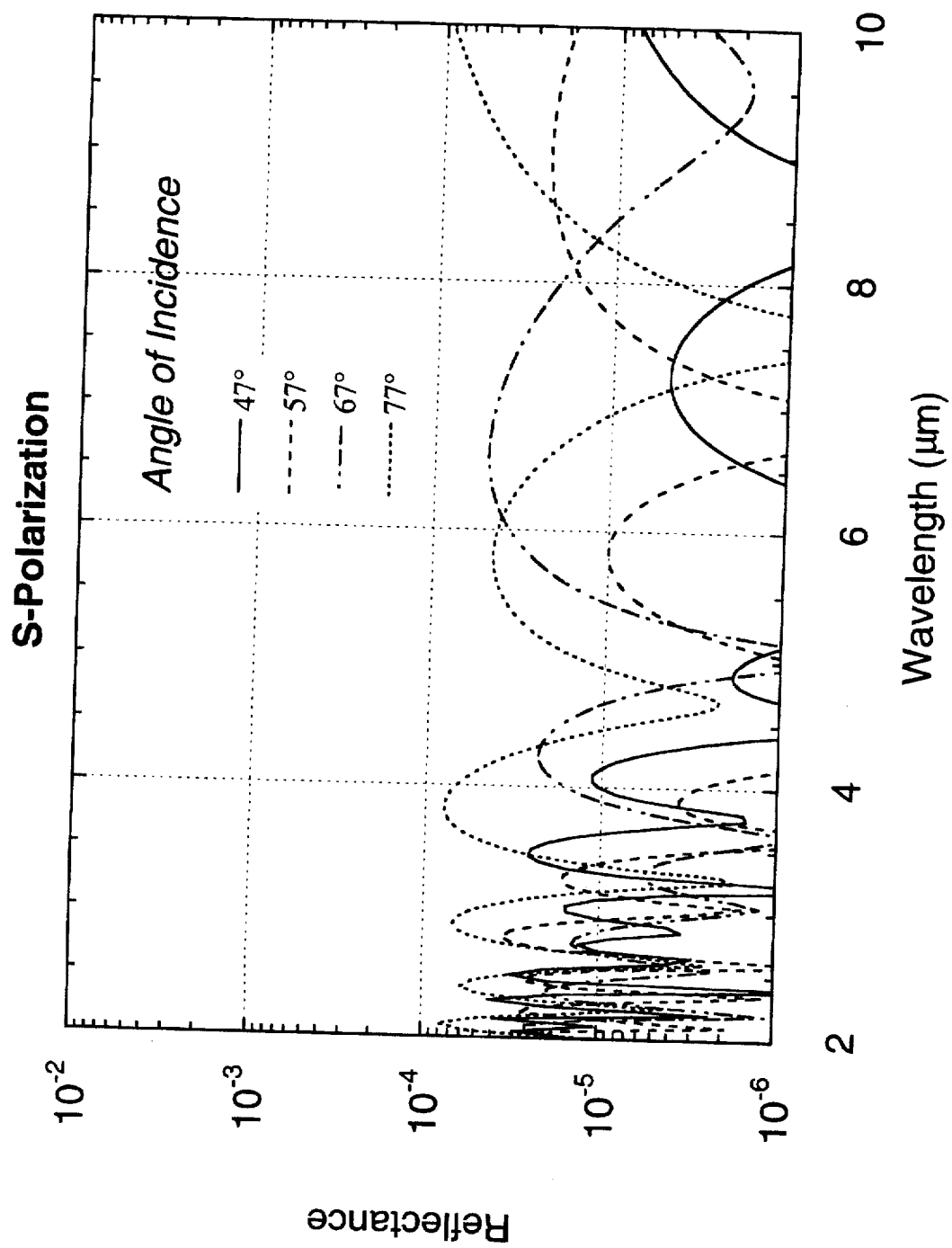
Figure 31:
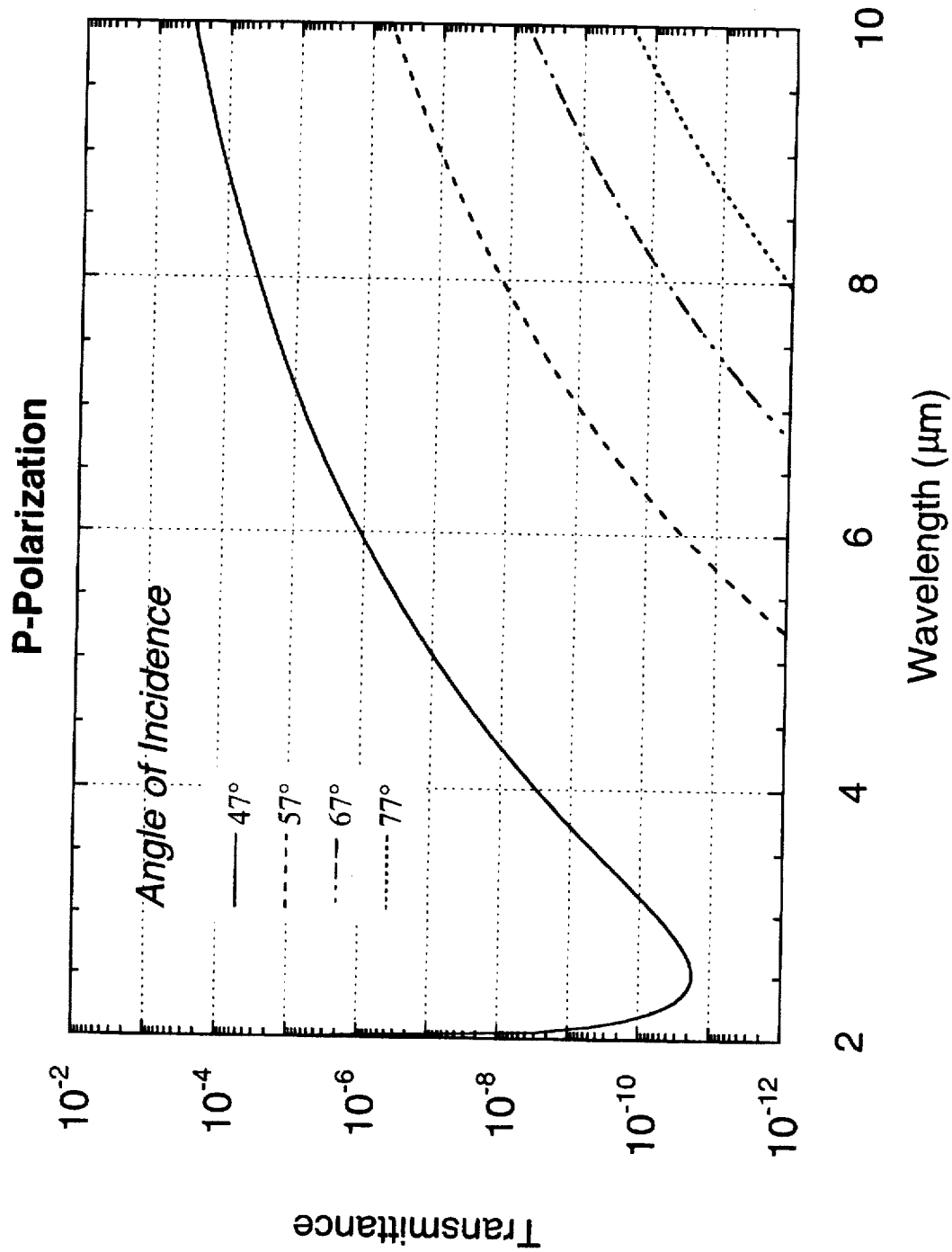
Figure 32:
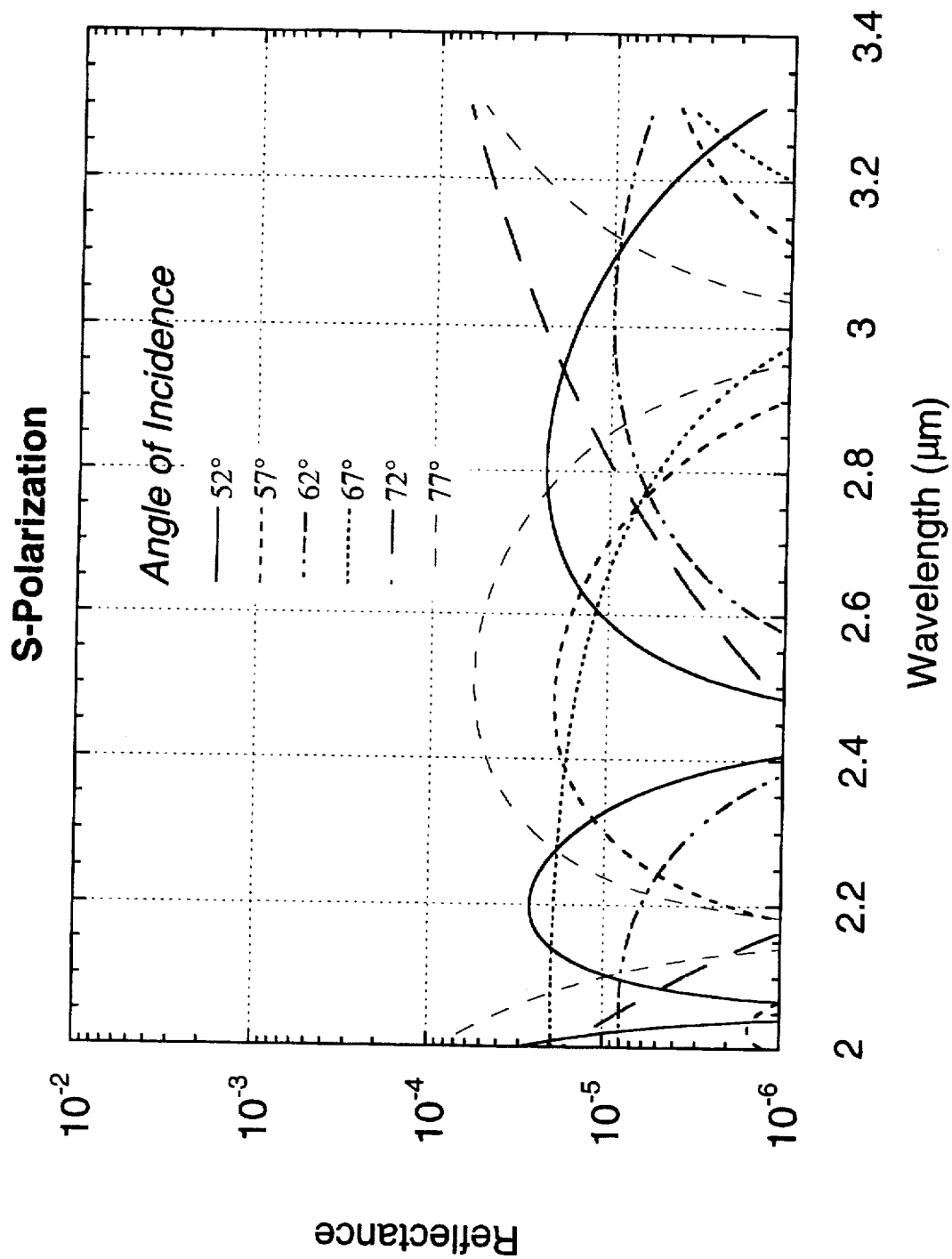
Figure 33:
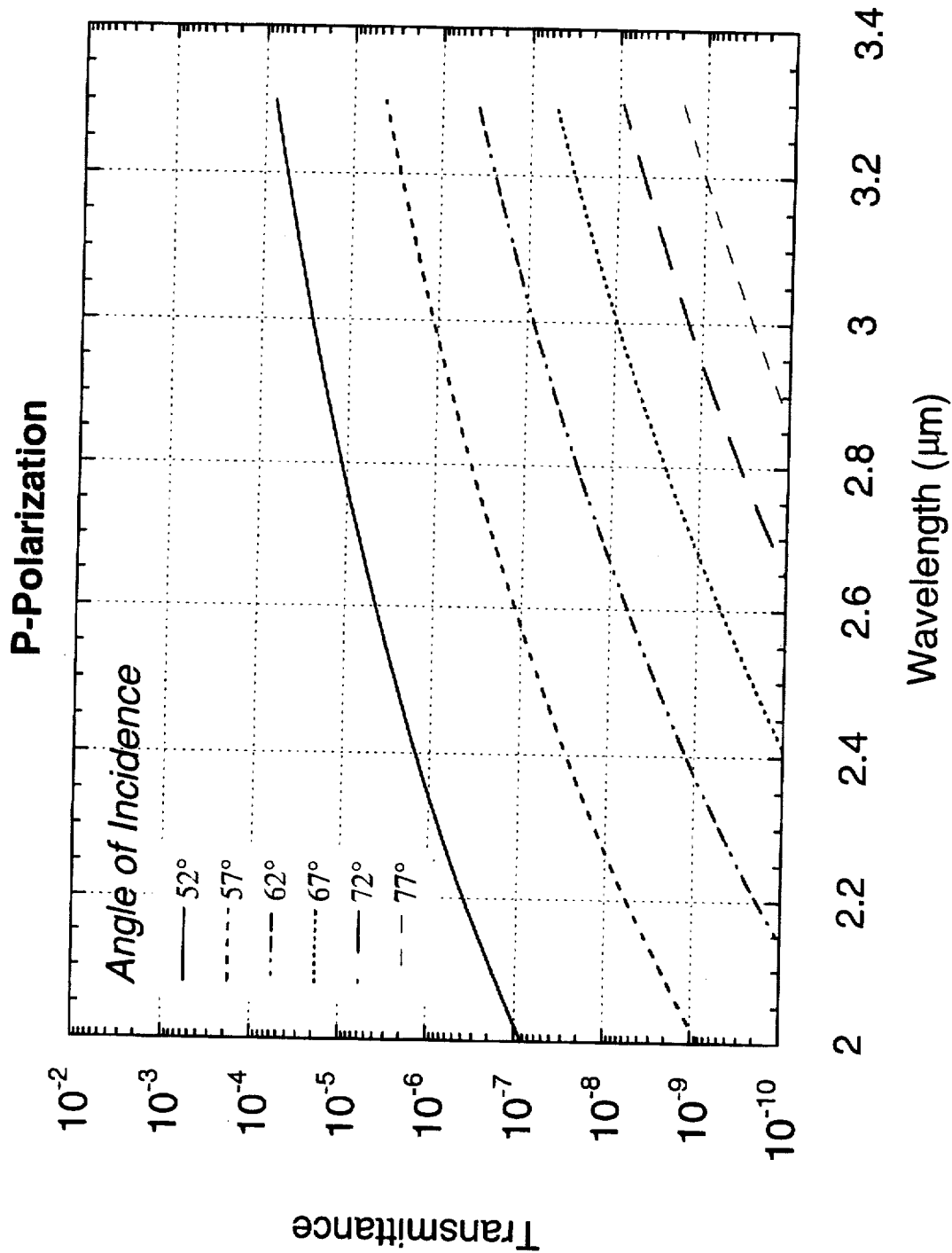
Figure 34:
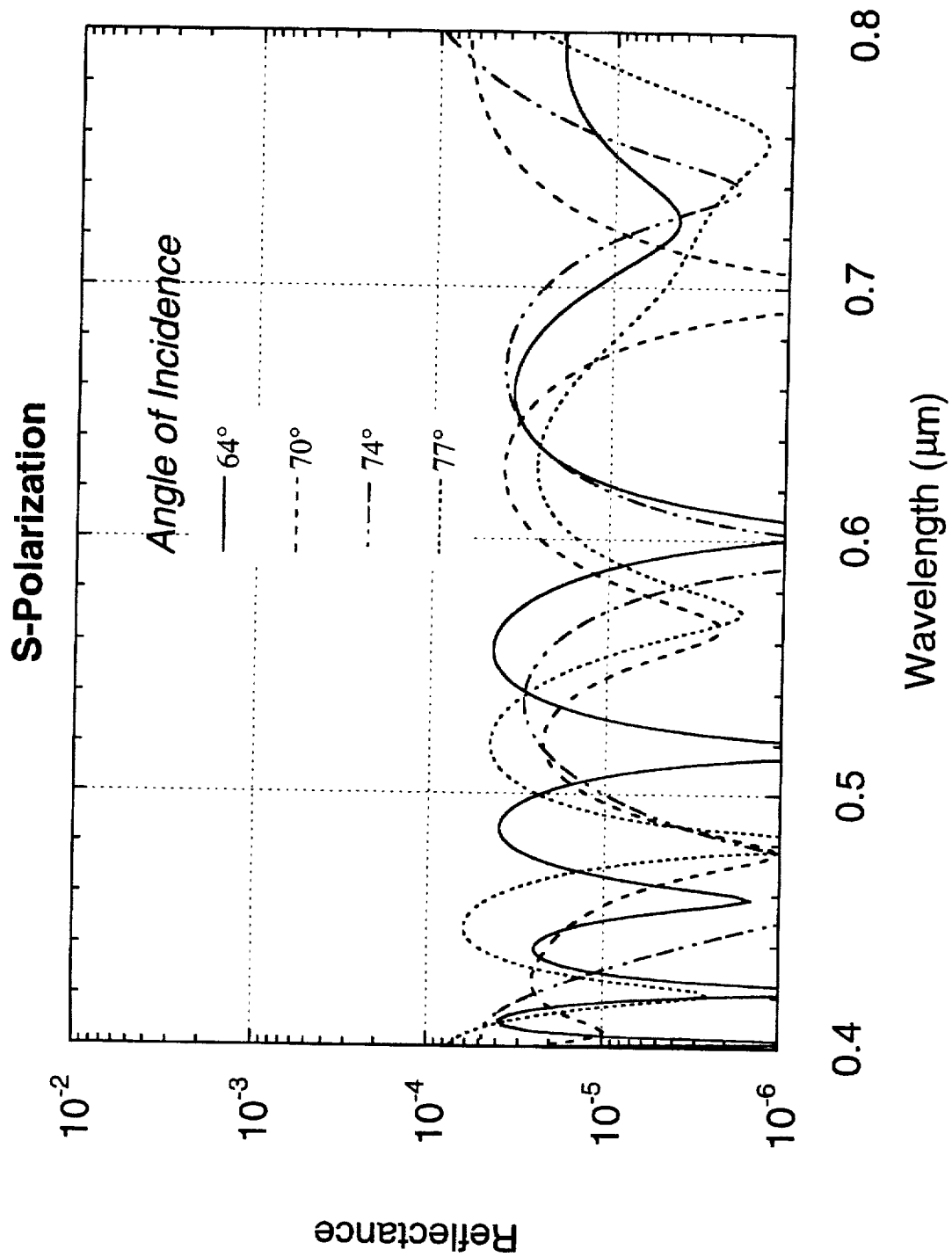
Figure 35:
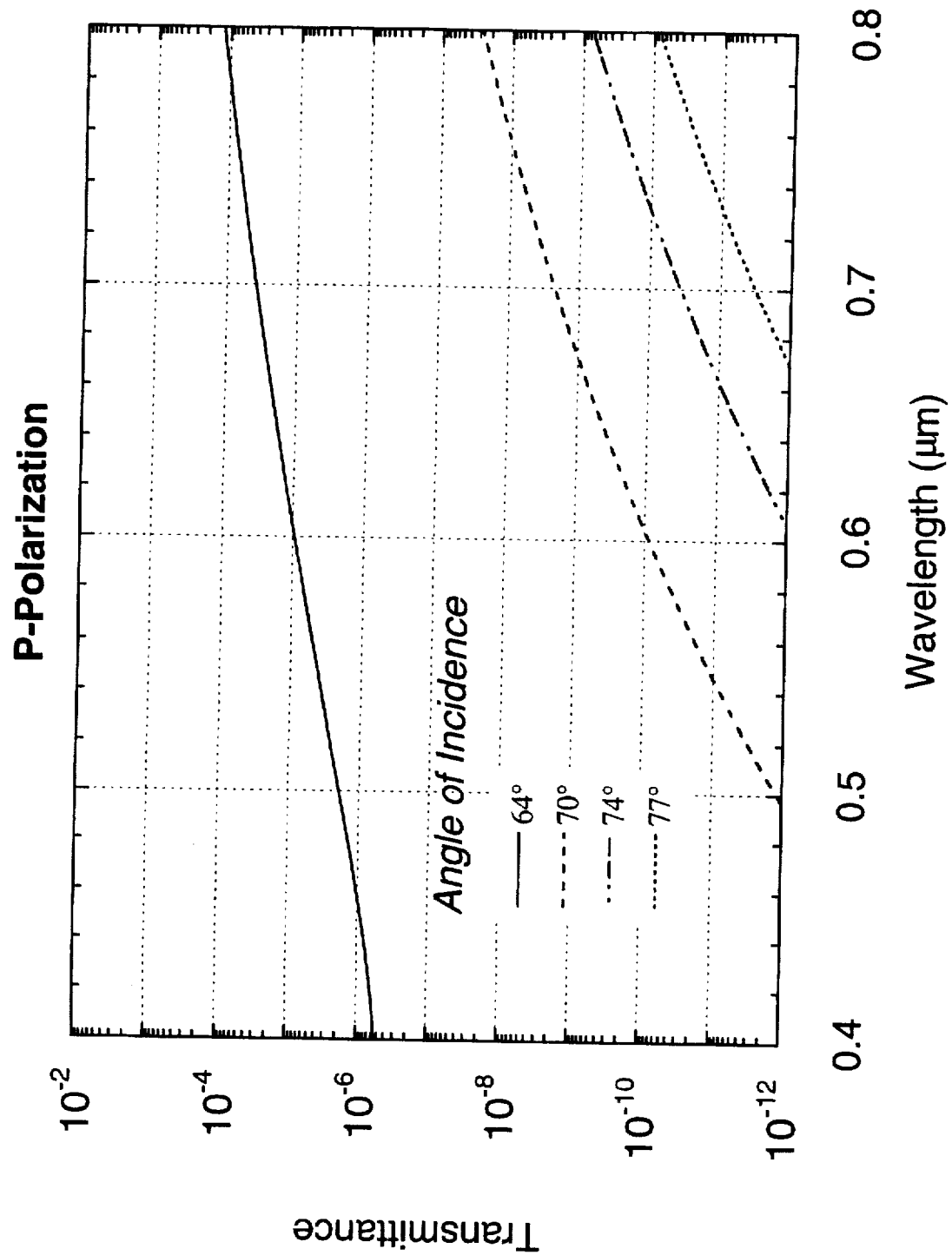
Figure 36:
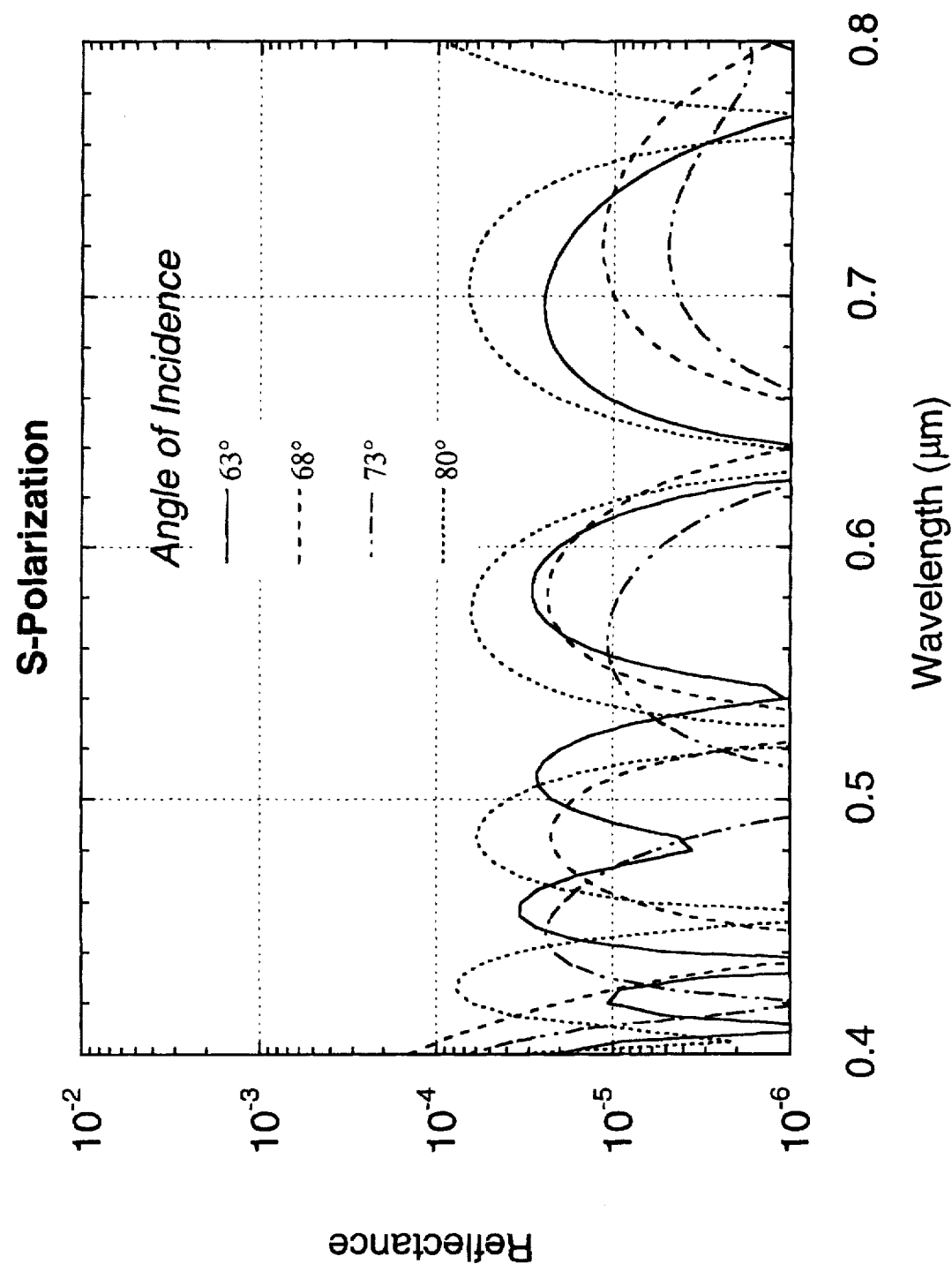
Figure 37:
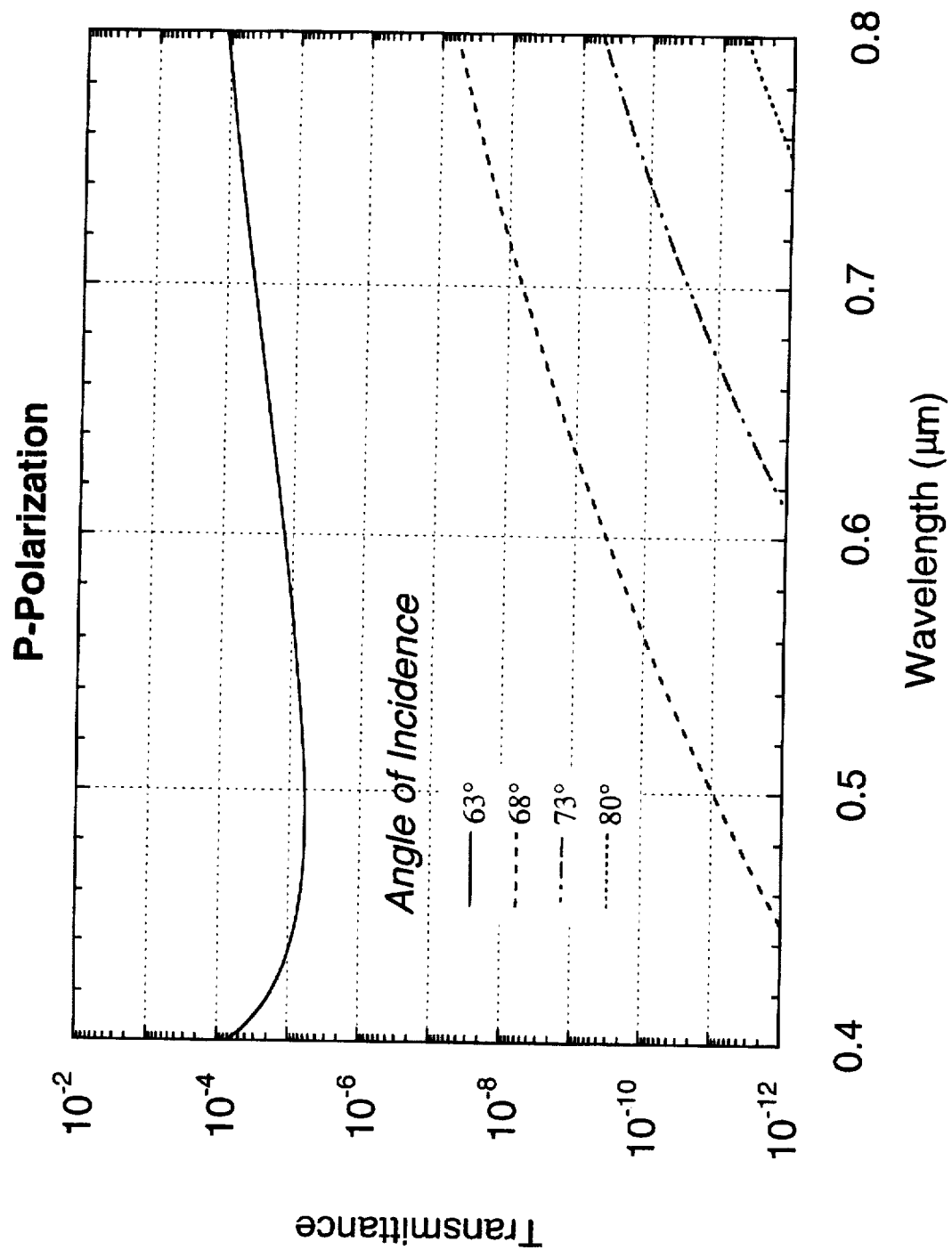

FIG. 21 shows the calculated reflectance curves for s-polarized light as a function of wavelength ratio for a thin film system having 100 periods of the basic structure as in FIG. 19. The angles of incidences are 50°, 55° and 60°;

FIG. 22 shows the calculated transmittance curves for p-polarized light as a function of wavelength ratio for the same thin film system as in FIG. 19. The angles of incidences are 50°, 55°, and 60°;

FIG. 23 is a cross-sectional view of a thin film system used in the thin film polarizing device in accordance with the present invention;

FIG. 24 is a cross-sectional view of one embodiment of a thin film polarizing device in accordance with the present invention. The device acts as a polarizer and only transmitted s-polarized light is used;

FIG. 25 is a cross-sectional view of another embodiment of a thin film polarizing device in accordance with the present invention. The device acts also as a polarizer and only reflected p-polarized light is used;

FIG. 26 is a cross-sectional view of another embodiment of a thin film polarizing device in accordance with the present invention. The device acts as a polarizing beam-splitter and both transmitted p-polarized light and reflected s-polarized light are used;

FIG. 27 is a cross-sectional view of another embodiment of a thin film polarizing device in accordance with the present invention. The thin film coating is embedded between two identical prisms. The device acts also as a polarizing beam-splitter and both transmitted p-polarized light and reflected s-polarized light are used;

FIG. 28 shows the calculated reflectance curves for s-polarized light as a function of wavelength ratio for the embodiment IR-1 at different angles of incidence;

FIG. 29 shows the calculated transmittance curves for p-polarized light as a function of wavelength ratio for the embodiment IR-1 at different angles of incidence;

FIG. 30 shows the calculated reflectance curves for s-polarized light as a function of wavelength ratio for the embodiment IR-2 at different angles of incidence;

FIG. 31 shows the calculated transmittance curves for p-polarized light as a function of wavelength ratio for the embodiment IR-2 at different angles of incidence;

FIG. 32 shows the calculated reflectance curves for s-polarized light as a function of wavelength ratio for the embodiment IR-2 at different angles of incidence;

FIG. 33 shows the calculated transmittance curves for p-polarized light as a function of wavelength ratio for the embodiment IR-2 at different angles of incidence;

FIG. 34 shows the calculated reflectance curves for s-polarized light as a function of wavelength ratio for the embodiment VIS-1 at different angles of incidence;

FIG. 35 shows the calculated transmittance curves for p-polarized light as a function of wavelength ratio for the embodiment VIS-1 at different angles of incidence;

FIG. 36 shows the calculated reflectance curves for s-polarized light as a function of wavelength ratio for the embodiment VIS-2 at different angles of incidence; and, FIG. 37 shows the calculated transmittance curves for p-polarized light as a function of wavelength ratio for the embodiment VIS-2 at different angles of incidence.

The thin film polarizing device in accordance with the present invention is based not only on the principle of the frustrated total internal reflection but also on the interference of light in thin films. Because of this, the thin film polarizing devices are more versatile than devices obtained by conventional thin film design methods. General references to the design of thin film coatings including thin film polarizers or polarizing beam-splitters, can be found in the book entitled "Optical interference filters," written by H. A. Macleod (MacGraw Hill, 1986, New York). The phenomenon of frustrated total internal reflection is described in the paper "Some current developments in multilayer optical filters," by A. F. Turner in J. Phys. Radium 11, 440(1950), and related applications can also be found in the paper "Optical tunneling and its applications in optical filters," by P. W. Baumeister in App. Opt. 6, 897(1967).

Figure 1:
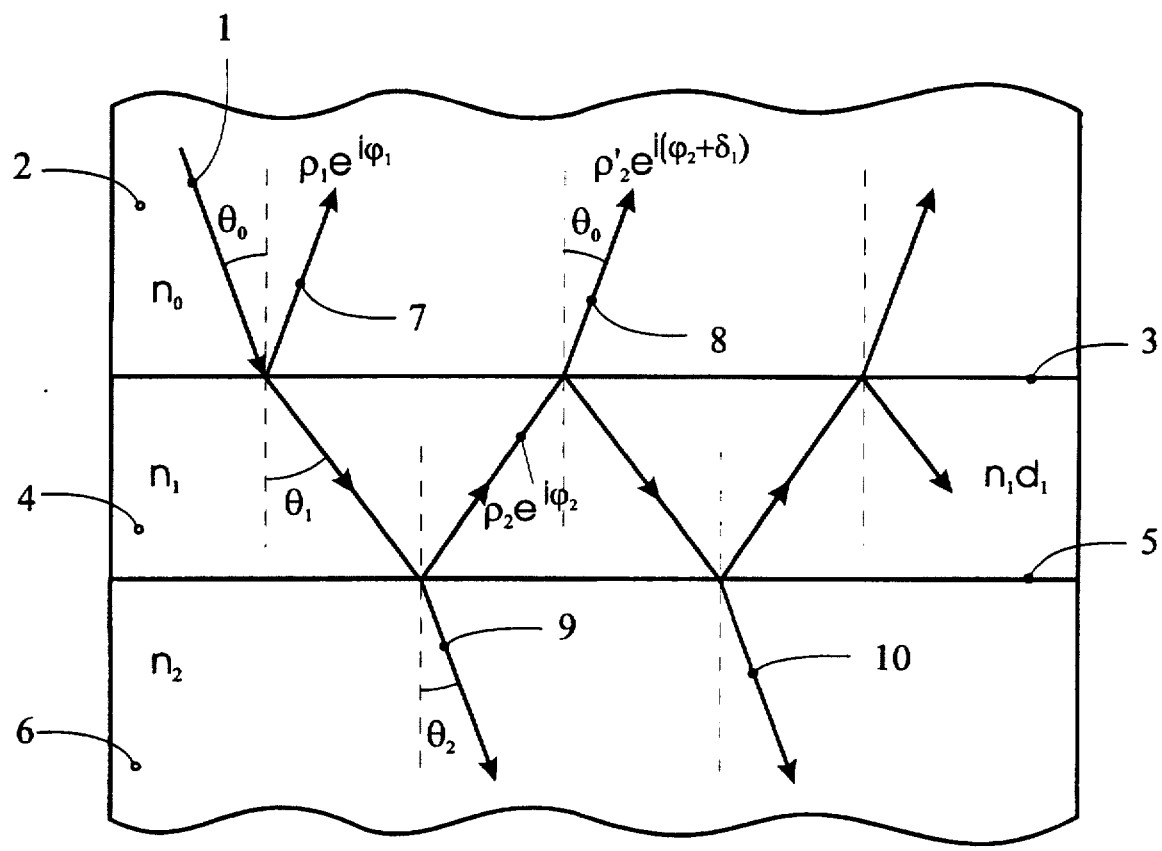
FIG. 1 is a schematic view showing the beams of light transmitted and reflected by the interfaces of a single thin film structure.

In order to explain the principle of the thin film polarizing device in accordance with the present invention, it is necessary to first explain the principle of light interference as well as of frustrated total internal reflection in thin films. This can be done with the help of a simplified thin film system shown in FIG. 1. Without departing from the principle and spirit of the present invention, the conclusions that can be drawn from the simplified thin film system are also applicable to the design of multilayer thin film coatings for the thin film polarizing devices. The thin film system in FIG. 1 is comprised of an incident medium 2 having a refractive index $n_0$, a thin film layer 4 having a refractive index $n_1$ and thickness $d_1$ and an exit medium 6 having a refractive index $n_2$. When light beam 1 is incident upon the thin film, some of the incident light is reflected at the interface 3 between the incident medium 2 and the layer 4, whilst the remaining light is transmitted. The transmitted light will be reflected and transmitted at the interface 5 between the layer 4 and the exit medium 6. This reflected beam will, in turn, undergo transmission and reflection at the interface 3 between the layer 4 and the incident medium 2, and so forth. Thus, the incident light beam 1 will undergo multiple reflections and transmissions at the two interfaces 3 and 5. All the reflected and transmitted light beams will interfere with each other. For the sake of simplicity, only two reflected beams 7 and 8, and two transmitted beams 9 and 10 are shown in FIG. 1. The angles of incidence of the beams at the interface 3 and the interface 5 are $\theta_0$ and $\theta_1$, respectively. $\theta_2$ is the angle of refraction in the exit medium 6, respectively. The relationship between these angles is governed by Snell's Law:

$$n_0 \sin \theta_0 = n_1 \sin \theta_1 = n_2 \sin \theta_2 \qquad (1)$$

The reflection coefficients $r_1$ and $r_2$ of light at the interfaces 3 and 5 can be calculated from the well-known Fresnel Formula:

$$\begin{cases} r_1 = \dfrac{\eta_0 - \eta_1}{\eta_0 + \eta_1} = \rho_1 e^{i\varphi_1} \\ r_2 = \dfrac{\eta_1 - \eta_2}{\eta_1 + \eta_2} = \rho_2 e^{i\varphi_2} \end{cases} \quad (2)$$

where $\rho_1$ and $\rho_2$ are the amplitude reflection coefficients, $\phi_1$ and $\phi_2$ are the phase changes on reflection at the two interfaces 3 and 5 respectively, and $\eta_0$, $\eta_1$ and $\eta_2$ are the optical admittances of the incident medium 2, the layer 4 and the exit medium 6. The optical admittances are different for s-polarized and p-polarized light and are given by:

$$\begin{cases} \eta_0 = \eta_0 \cos\theta_0 \\ \eta_1 = \eta_1 \cos\theta_1, \text{ for } s\text{-polarized light,} \\ \eta_2 = \eta_2 \cos\theta_2 \end{cases} \quad (3)$$

$$\begin{cases} \eta_0 = \eta_0 / \cos\theta_0 \\ \eta_1 = \eta_1 \cos\theta_1, \text{ for } p\text{-polarized light,} \\ \eta_2 = \eta_2 / \cos\theta_2 \end{cases} \quad (4)$$

Clearly, the interference effect of light will not only depend on the reflection coefficients $r_1$ and $r_2$, but also on the phase difference $\Delta\phi$ between two adjacent reflected or transmitted beams. The phase difference $\Delta\phi$ can be expressed by the following equations:

$$\begin{cases} \Delta\varphi = \varphi_2 - \varphi_1 + \delta_1 \\ \delta_1 = \dfrac{2\pi}{\lambda} n_1 d_1 \cos\theta_1 \end{cases} \quad (5)$$

where $\lambda$ is the wavelength of the incident light and $\delta_1$ is the phase thickness of the layer 4.

Figure 2:
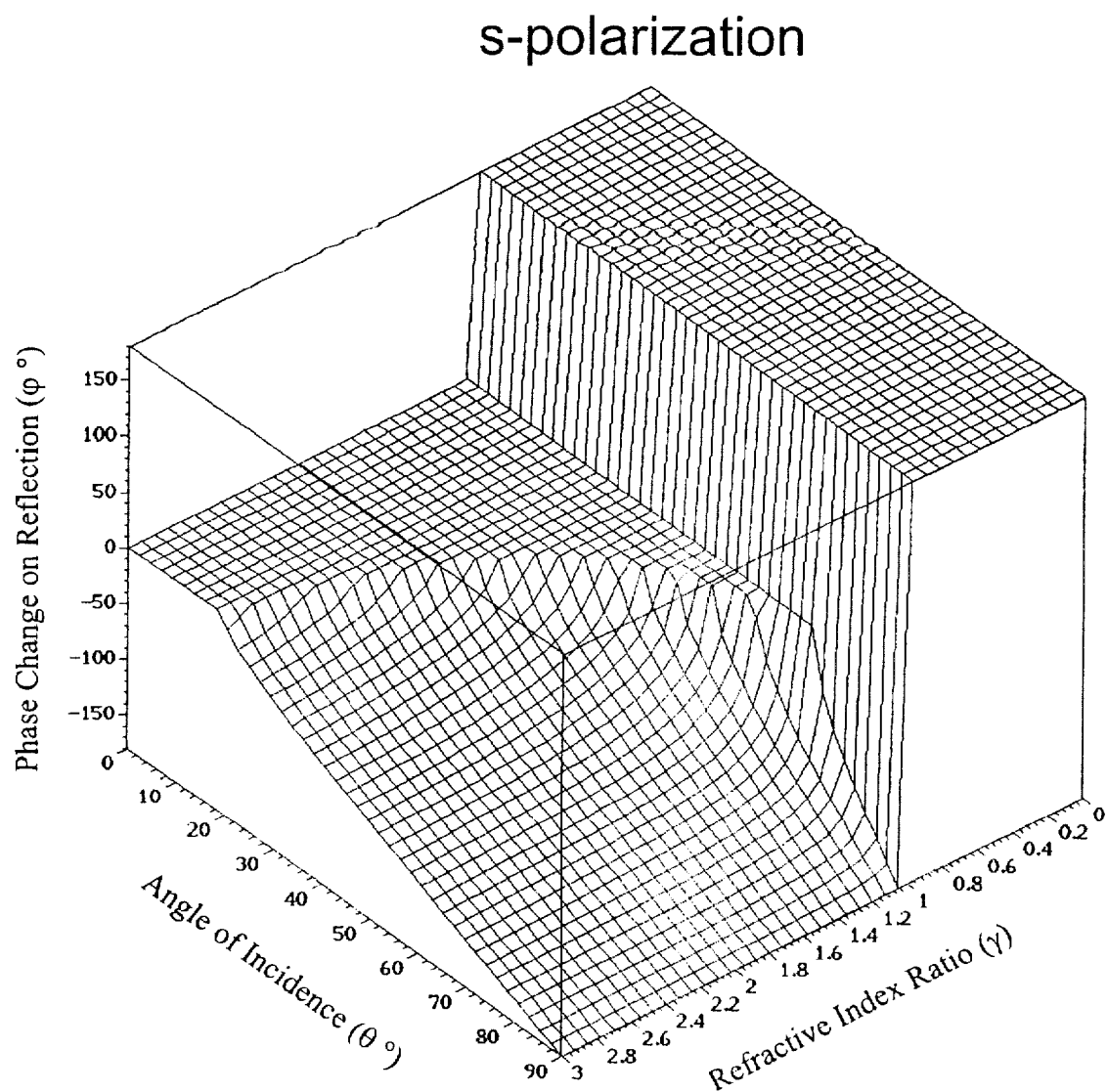
FIG. 2 is a three-dimensional view of the phase change on reflection as a function of the angle of incidence and of the refractive index ratio for s-polarized light.
Figure 3:
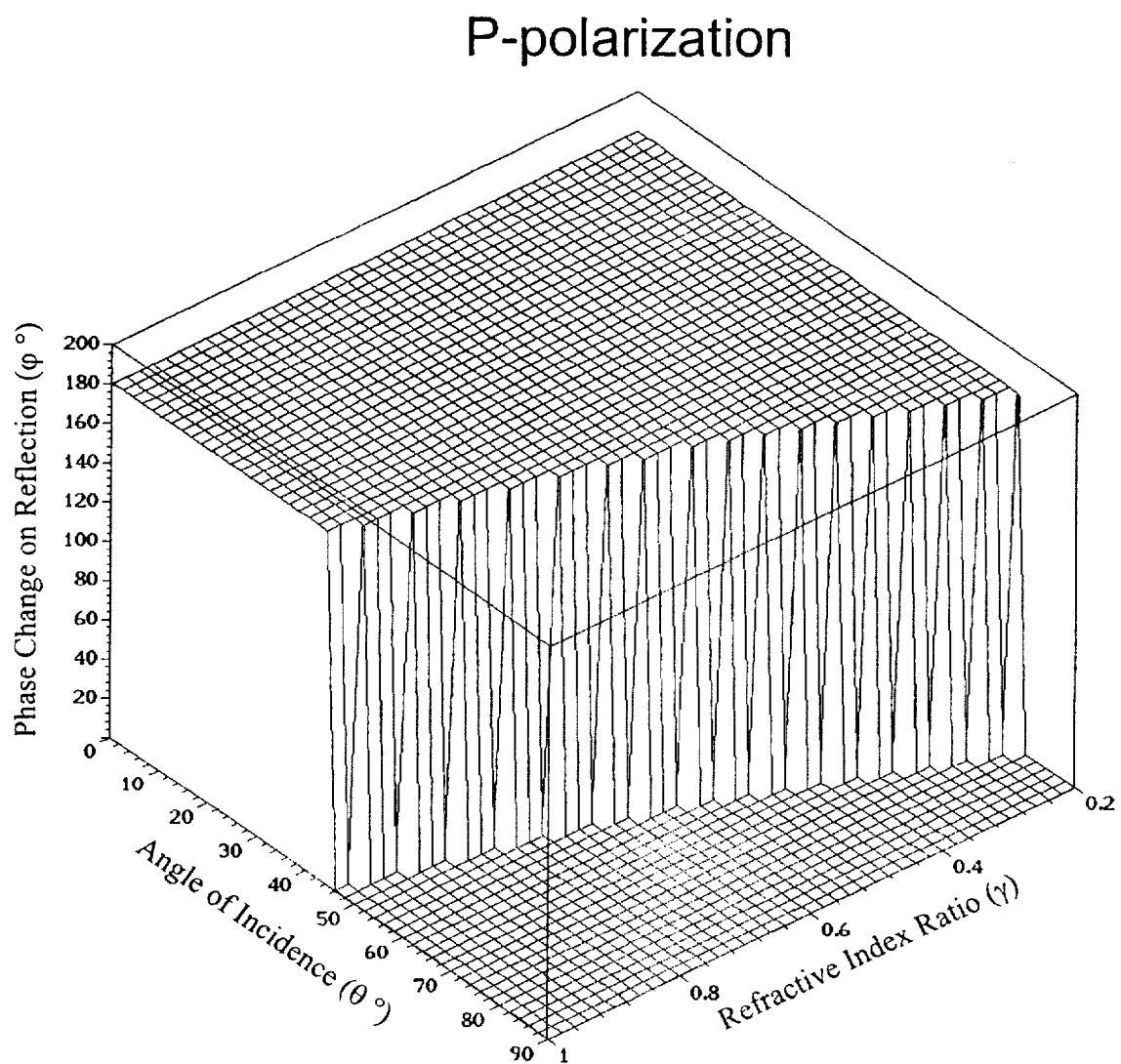
FIG. 3 is a three-dimensional view of the phase change on reflection as a function of the angle of incidence and of the refractive index ratio for p-polarized light the refractive index ratio γ is between 0.2 and 1.

In conventional thin film designs, either the angles of incidence of light are less than the critical angle or no critical angles exist. This means that for non-absorbing materials the phase changes on reflection $\phi_1$ and $\phi_2$ for both s- and p-polarized light are either 0° or 180° as shown in FIG. 2 and FIG. 3. This is because $\eta_0$, $\eta_1$ and $\eta_2$ are real numbers. Thus, once the coating materials have been chosen, phase changes on reflection at the interfaces have little effect on the thin film design. Only variations in the layer thicknesses can be used to obtain a desired performance.

Figure 4:
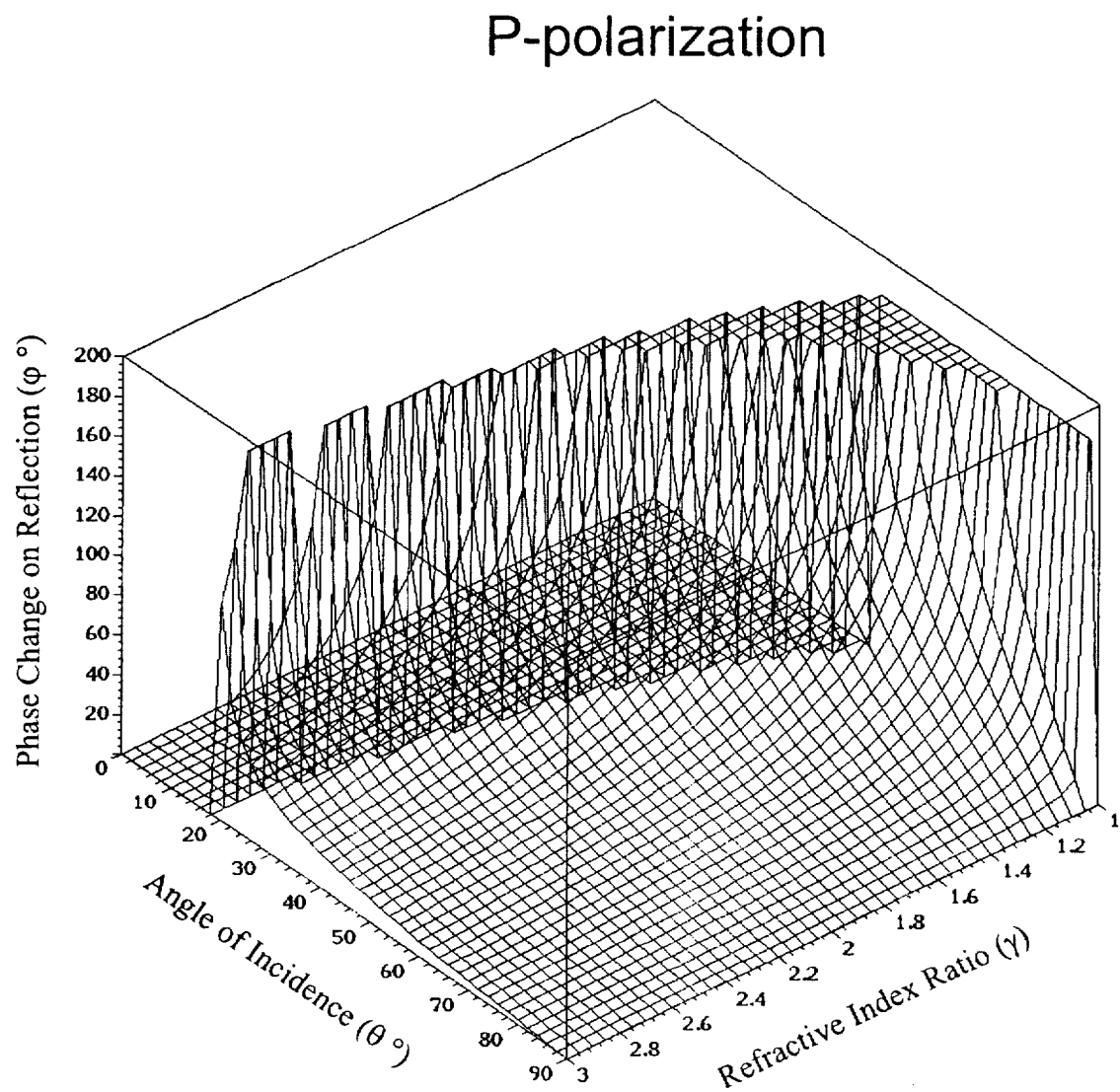
FIG. 4 is a three-dimensional view of the phase change on reflection as a function of the angle of incidence and of the refractive index ratio for p-polarized light, the refractive index ratio γ is between 1 and 3.
Figure 5:
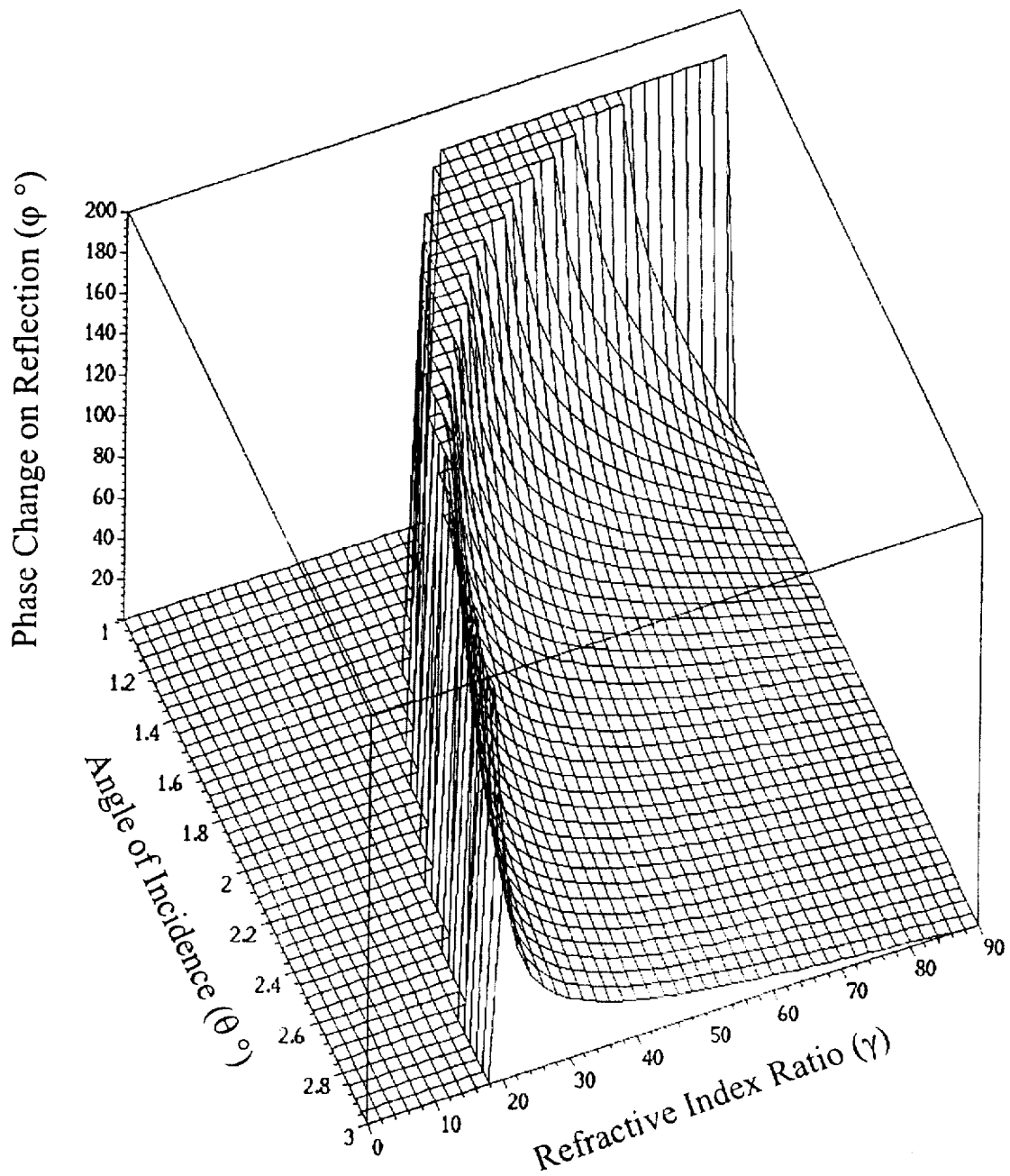
FIG. 5 shows another three-dimensional view of the phase change on reflection for p-polarized light as in FIG. 4.

However, when $n_0 > n_1$ and when the angle of incidence $\theta_0$ is larger than the critical angle $\theta_C = \sin^{-1}(n_0/n_1)$, the reflection coefficient $r_1$ at the interface 3 will no longer be a real number. As a consequence, the phase change on reflection will also be much more complicated. Three-dimensional diagrams of the phase changes on reflection for both s- and p-polarized light, respectively, at the interface 3, are plotted as a function of the angle of incidence $\theta_0$ and of tie refractive index ratio $\gamma(\gamma = n_0/n_1)$ for s-polarized light (FIG. 2) and p-polarized light (FIGS. 3, 4 and 5). These figures are particularly revealing of phenomena that are utilized in accordance with this invention:

1. As stated before when the angle of incidence $\theta_0$ is less than the critical angle $\theta_C$, the phase change on reflection for s-polarized light is 0° (FIG. 2). The phase change on reflection for p-polarized light is 0° when the angle of incidence $\theta_0$ lies between 0° and the Brewster angle $\theta_B = \tan^{-1}(n_0/n_1)(\theta_C > \theta_B)$, and it is 180° when the angle of incidence is between the Brewster angle $\theta_B$ and the critical angle $\theta_C$ (FIG. 4).

2. When the angle of incidence $\theta_0$ is larger than the critical angle $\theta_C$ the phase change on reflection for s-polarized light changes from 0° to 180° as the angle of incidence $\theta_C$ increases from the critical angle $\theta_C$ to 90° (FIG. 2). For p-polarized light the phase change on reflection decreases from 180° to 0° as the angle of incidence $\theta_0$ increases from the critical angle $\theta_C$ to 90° (FIGS. 4 and 5).

Some conclusions can be also drawn from the above diagrams. First, the phase chance on reflection increases or decreases rapidly when the angle of incidence $\theta_0$ is close to the critical angle $\theta_c$ or when the refractive index ratio $\gamma$ is small. In other words, under those conditions, the dispersion of the phase change on reflection with the angle of incidence is very large. Second, if the thickness of the low refractive index layer 4 is small compared to the wavelength of the incident light, some light will leak out from the low refractive index layer 4 and enter the exit medium 6 even though the total internal reflection condition is satisfied. This phenomenon is called frustrated total internal reflection. Third and most importantly, the phase change on reflection characteristics for s- and p-polarized light are very different.

The above phenomena make it possible to design thin film coatings that are based not only on the interference effect of light in thin films but also on the frustrated total internal reflection of light in thin films. Therefore, in a multilayer structure consisting of alternating low and high refractive index layers, phase changes on reflection at the interfaces as well as the layer thicknesses contribute to the interference effects. This provides an extra degree of freedom for the design of optical thin film coatings. The thin film coatings can thus have very different requirements for s- and p-polarized light.

It is evident from FIGS. 2, 4 and 5 that, when light passes from a high refractive index layer to a low refractive index layer and when the angle of incidence is larger than the critical angle, the phase changes on reflection for the s- and p-polarized light are no longer 0° or 180°. Since the phase changes on reflection are different, such multilayer structures are useful for the design of thin film polarizing devices in accordance with the present invention.

In multilayer structures of this type, low and high refractive index layers affect the propagation of light very differently. When the angle of incidence is larger than the critical angle, for the low refractive index layer, the optical admittance $\eta_L$ and the phase thickness $\delta_L$ are imaginary. Hence, the layer thickness of the low refractive index therefore purely affect the the amplitude of the reflected light. In other words, the low refractive index layer acts as an attenuator or behaves like a metal layer, but without the effect of light absorption. If the thickness of the low refractive index layer is small compared to the wavelength of light, frustrated total internal reflection will occur at all the $n_H/n_L$ interfaces and some of the light will leak out from the low refractive index layers and enter the adjacent layers. The amount of light leakage depends on the thickness of the low refractive index layer and also on the angle of incidence. On the other hand, at $n_L/n_H$ interfaces, the total internal reflection condition of light is not satisfied, and therefore, the high refractive index layers act as phase adjusters. Their layer thicknesses contribute to the phase changes on reflection and do not attenuate the light. All the light beams reflected from the $n_H/n_L$ and $n_L/n_H$ interfaces will interfere with each other and, as a result, modify the reflection and transmission of the light.

The above phenomena of the interference and frustrated total internal reflection in thin films is fully utilized in the thin film polarizing device in accordance with the present invention. Several approaches can be used for the design of such thin film polarizing devices. For example, one can use one of various optimization methods described in the paper by J. A. Dobrowolski and R. A. Kemp, Appl. Opt. 29, 2876(1990), or the needle design method described by S. A. Furman and A. V. Tikhonrovov in the book entitled "Optics of multilayer system," published by Edition Frontiers in 1992, Gif-sur-Yvette, or the equivalent optical admittance method as described in the book by J. Tang and Q. Zhen, entitled "Applied thin film optics," published by Shanghai Publishing House of Sciences and Technologies in 1984, Shanghai. Of these methods, the equivalent optical admittance method, applied to a symmetrical periodic layer structure is the best for a good understanding of the physics of the thin film polarizing device in accordance with the present invention.

Figure 6:
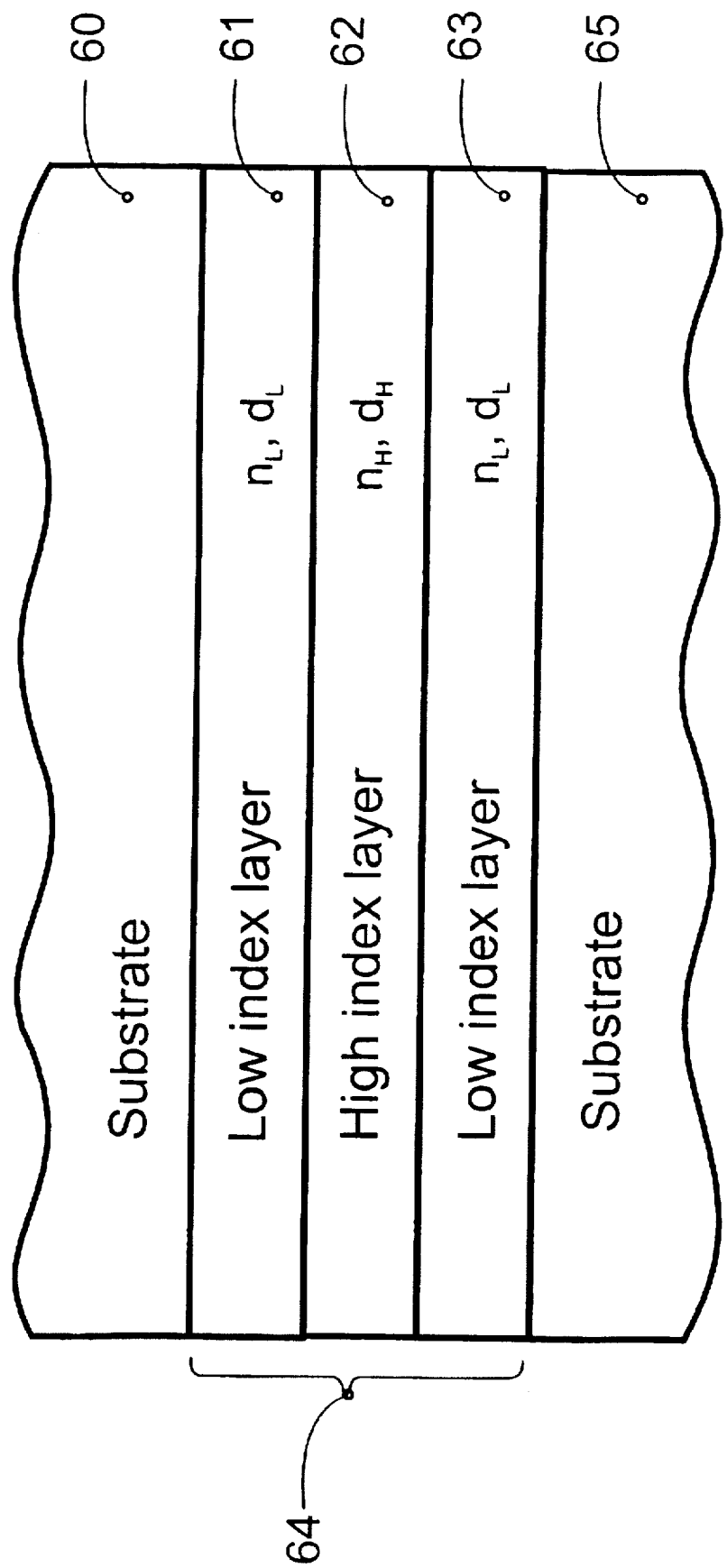
FIG. 6 is a cross-sectional view of a basic thin film structure having low high and low refractive index layers embedded between two substrates.
Figure 7:
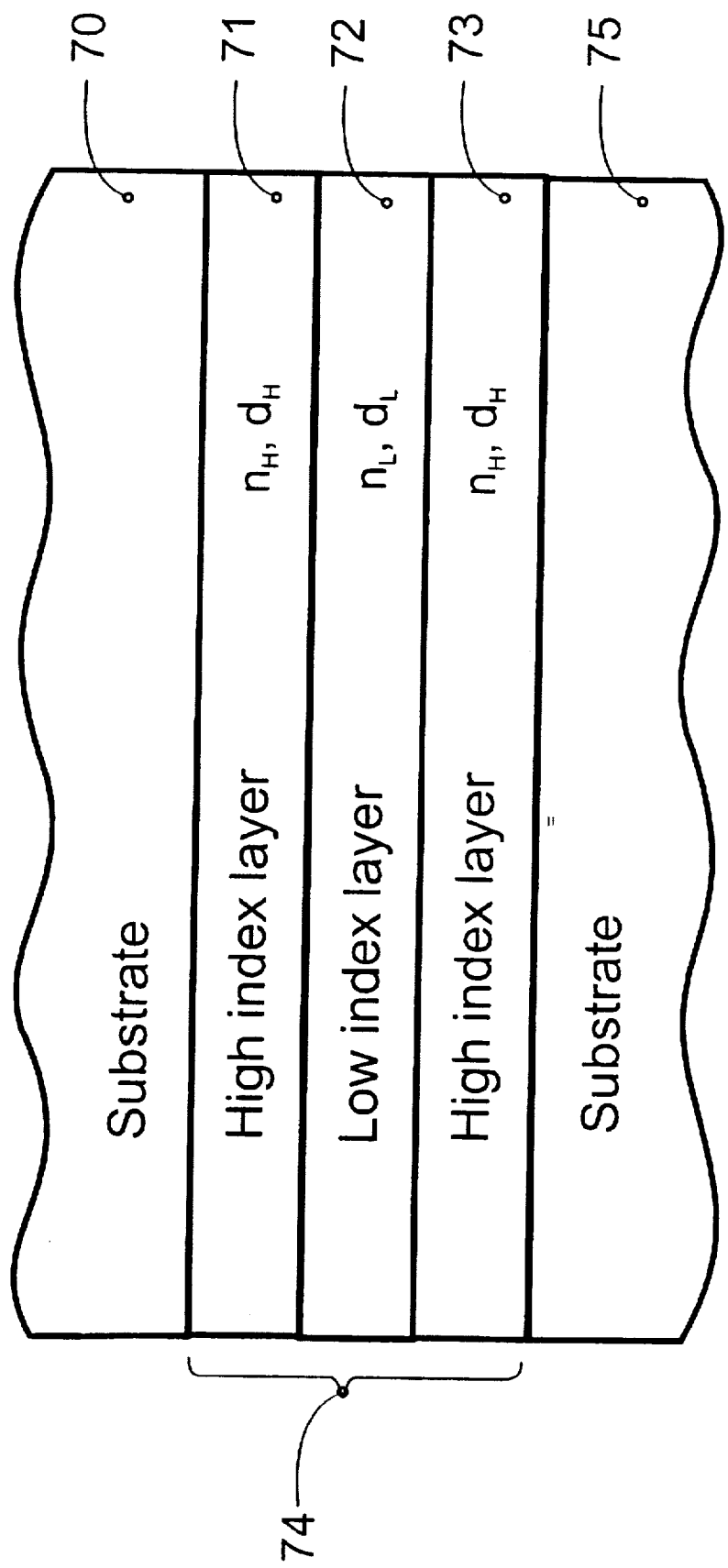
FIG. 7 is a cross-sectional view of another basic thin film structure having high, low and high refractive index layers embedded between two substrates.

In FIG. 6, a basic thin film symmetrical structure 64 is comprised of a low refractive index layer 61, a high refractive index layer 62 and a low refractive index layer 63 and the layers are embedded between two identical substrates 60 and 65. The two low refractive index layers 61 and 63 are identical. Alternatively, as shown in FIG. 7, a basic thin film symmetrical structure 74 consists of a high refractive index layer 71, a low refractive index layer 72 and a high refractive index layer 73. Layers 71 and 73 are identical and all three layers are embedded between two identical substrates 73 and 75. The analysis for both structures 64 and 74 is similar. In order to simplify the explanation process, in the following text, the analysis for the structure 64 shown in FIG. 6 will be discussed in detail and the analysis for structure 74 is similar. The equivalent optical admittance E and the equivalent phase thickness $\Gamma$ of the basic thin film symmetrical structure 64 can be calculated from the equations derived in the book "Applied Thin Film Optics" by J. Tang.

$$\begin{cases} E = \sqrt{\dfrac{\eta_L^2\left(\sin2\delta_L\cos\delta_H + \dfrac{1}{2}(\eta_L/\eta_H + \eta_H/\eta_L)\cos2\delta_L\sin\delta_H - \dfrac{1}{2}(\eta_L/\eta_H - \eta_H/\eta_L)\sin\delta_H\right)}{\left(\sin2\delta_L\cos\delta_H + \dfrac{1}{2}(\eta_L/\eta_H + \eta_H/\eta_L)\cos2\delta_L\sin\delta_H + \dfrac{1}{2}(\eta_L/\eta_H - \eta_H/\eta_L)\sin\delta_H\right)}} \\ \Gamma = \arccos\left(\cos2\delta_L\cos\delta_H - \dfrac{1}{2}(\eta_L/\eta_H + \eta_H/\eta_L)\sin2\delta_L\sin\delta_H\right) \end{cases} \quad (6)$$

where $\eta_L$, $\eta_H$, $\eta_0$, $\delta_L$ and $\delta_H$ are given by:

$$\begin{cases} \eta_L = \eta_L \cos\theta_L \\ \eta_H = \eta_H \cos\theta_H, \text{ for } s\text{-polarized light} \\ \eta_0 = \eta_0 \cos\theta_0 \end{cases} \quad (7)$$

$$\begin{cases} \eta_L = \eta_L / \cos\theta_L \\ \eta_H = \eta_H / \cos\theta_H, \text{ for } p\text{-polarized light} \\ \eta_0 = \eta_0 / \cos\theta_0 \end{cases} \quad (8)$$

$$\begin{cases} \delta_L = 2\pi n_L d_L \cos\theta_L / \lambda \\ \delta_H = 2\pi n_H d_H \cos\theta_H / \lambda \end{cases} \quad (9)$$

When the angle of incidence $\theta_0$ is larger than the critical angle for the low refractive index layer, $\eta_L$ and $\cos\theta_L$ will be imaginary, and $\eta_H$ and $\cos\theta_H$ will be real.

In order to transmit all the s-polarized light, the equivalent optical admittance E of the basic structure 64 should be equal to the optical admittance of the substrate $\eta_0$ for the s-polarized light, i.e, $$E^s = n_0 \cos\theta_0 \quad (10)$$

For a given angle of incidence $\theta_0$ and a wavelength of incident light, it is possible to find solutions for the layer thicknesses $d_1$ and $d_2$ that satisfy Eq. (10). Because there are two variables and only one equation to satisfy, there will be an infinite number of solutions. Therefore, it is possible to specify a second angle of incidence or a second wavelength in order to broaden the angular field or the band width of the thin film polarizing device.

It can be shown that a multilayer structure consisting of S periods of the above basic structure can be replaced by a single layer with the same equivalent optical admittance E and an equivalent phase thickness of S*$\Gamma$. The reflectance and transmittance of such multilayer structure for s- and p-polarized light are best calculated using a computer program based on the matrix method as described in the book "Optical interference filters" by H. A. Macleod.

To demonstrate the performance of the above basic thin film structure, a thin film system with a $n_0$/aL//bH/aL/$n_0$ structure has been designed. Here, a and b stand for the optical thicknesses of the low and high refractive index layers respectively, and $n_0=2.35$, $n_L=1.45$, $n_H=4.0$. For an angle of incidence $\theta_0=57.3°$ and a wavelength $\lambda_0=4$ $\mu$m. the optical thicknesses $\alpha$ and $\beta$ were then calculated to be 17.9 nm and 31.3 nm. The corresponding calculated equivalent optical admittance E and equivalent phase change on reflection $\Gamma$ for both s-polarized light and p-polarized light are plotted in FIGS. 8 and 9 and FIGS. 10 and 11, respectively. It is clear from the above equations that both the equivalent optical admittance and the equivalent phase thickness $\Gamma$ clould be complex. Hence both the real and the imaginary parts of the two parameters are plotted in the above diagrams.

Figure 12:
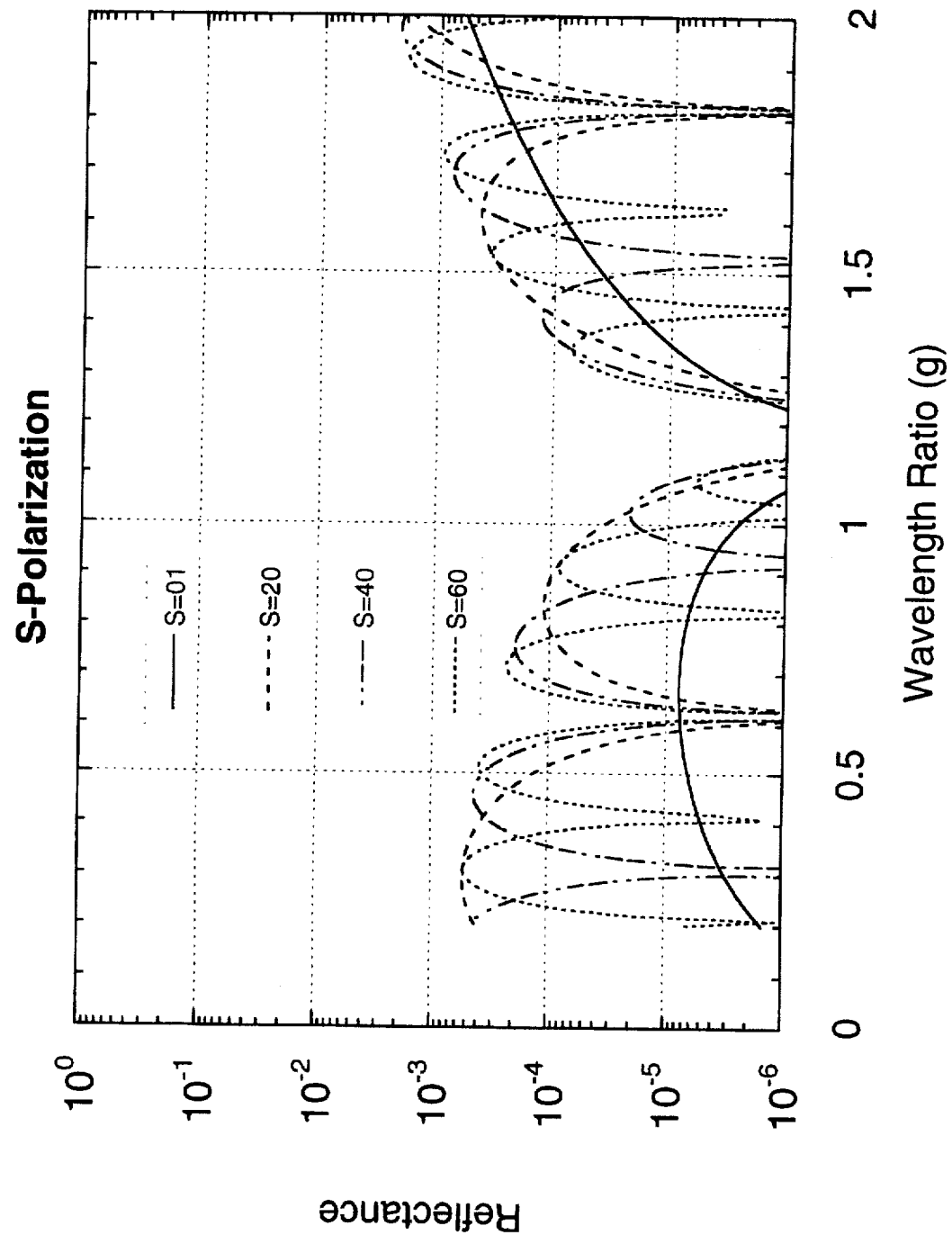
FIG. 12 shows the calculated reflectance curves for s-polarized light as a function of wavelength ratio for thin film systems having 1, 20, 40 and 60 periods of a three-layer basic structure as in FIG. 8. The angle of incidence $\theta_0$ is 57.3°.
Figure 13:
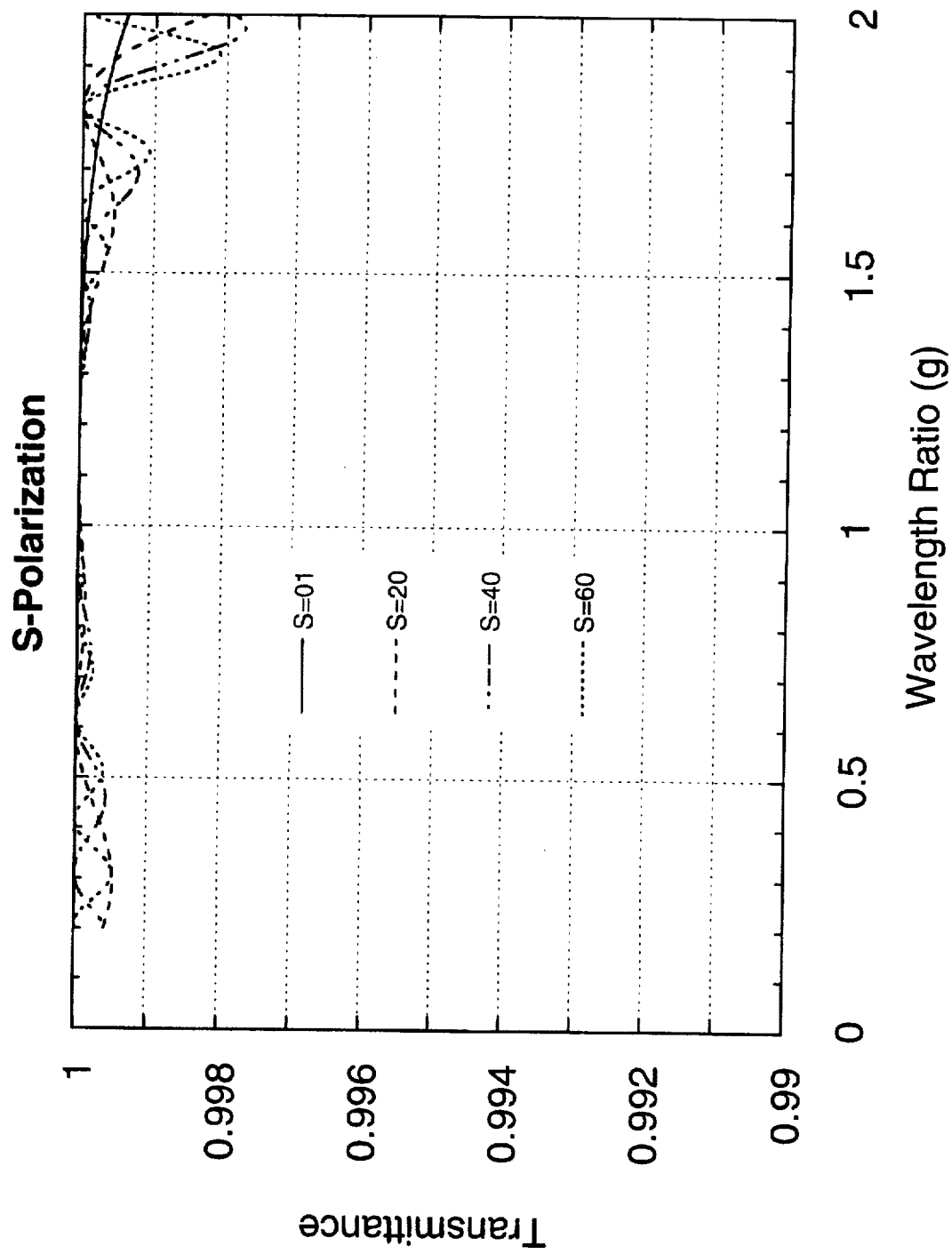
FIG. 13 shows the calculated transmittance curves for s-polarized light as a function of wavelength ratio for the same thin film systems as shown in FIG. 12. The angle of incidence $\theta_0$ is 57.3°.

As shown in FIG. 8, the equivalent optical admittance for s-polarized light has only real part and is completely matched to the optical admittance of the substrate $\eta_0$ over a very broad spectral region $0.2 < g = \lambda_0/\lambda < 2$. Therefore, very little s-polarized light is reflected and most of the s-polarized light is transmitted over this broad wavelength region. This is confirmed by the calculated reflectance and transmittance of the s-polarized light shown in FIGS. 12 and 13. As the number of periods of the basic structure S increases, the equivalent optical admittance is the same for s-polarized light. Therefore, the calculated reflectance does not show any significant change over the above broad wavelength region as is shown in FIG. 12. Hence, the performance for s-polarized light is essentially the same, regardless of the number of periods S.

Figure 10:
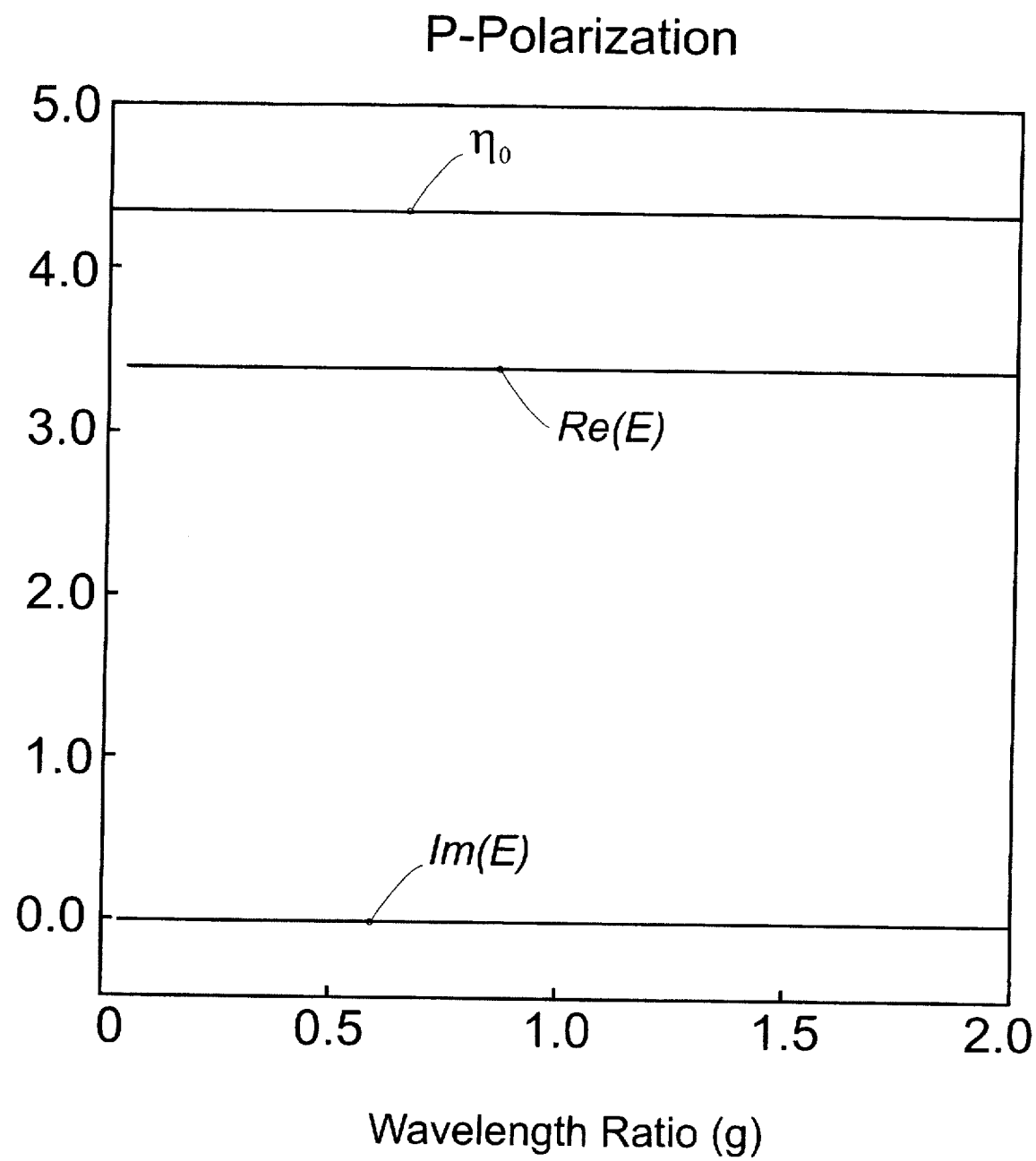
FIG. 10 shows the real and imaginary parts of the equivalent optical admittance of the same basic structure as in FIG. 8 and the optical admittance of the substrate as a function of wavelength ratio for p-polarized light.
Figure 11:
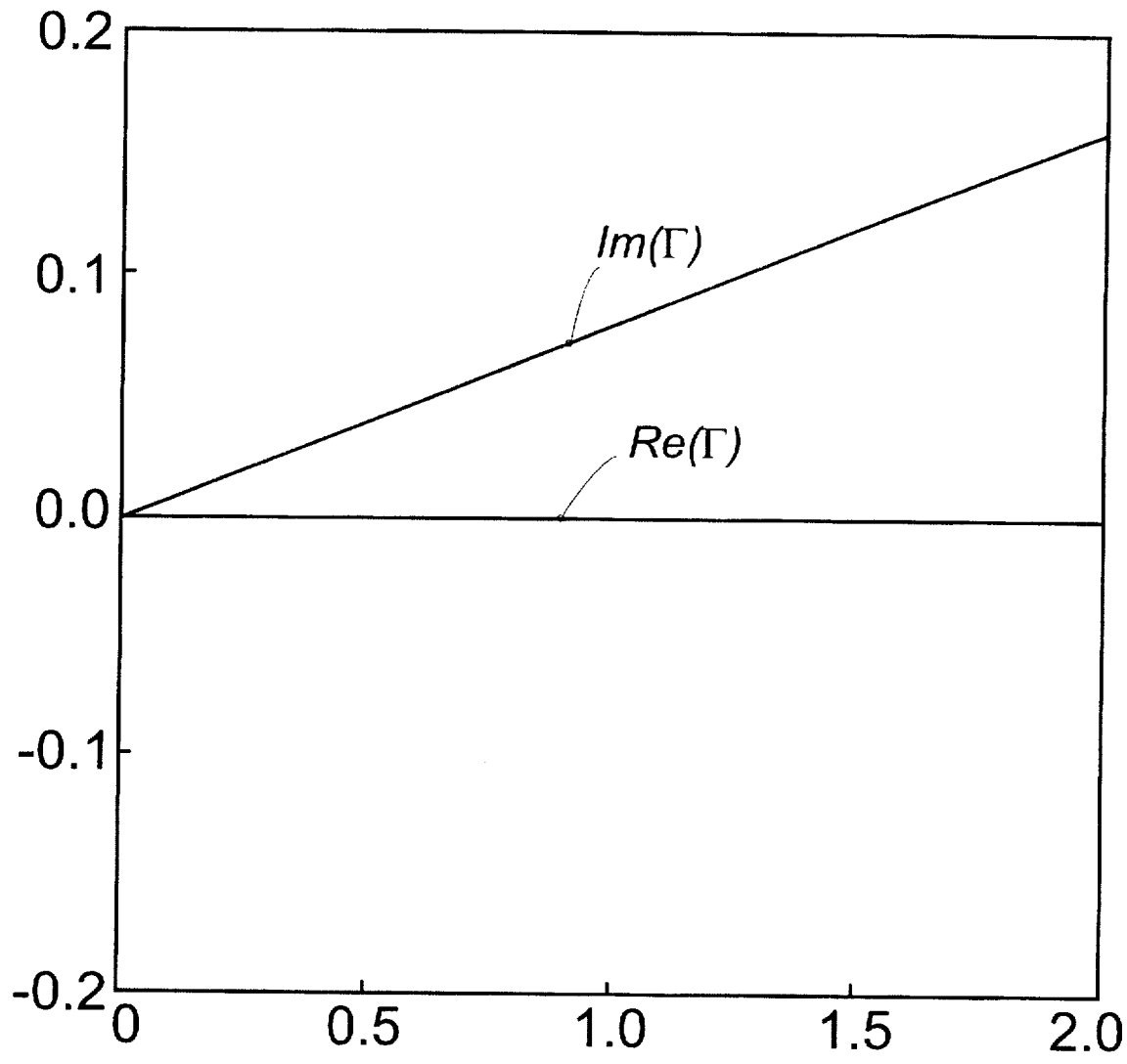
FIG. 11 shows the real and imaginary parts of the equivalent phase thickness of the same basic structure as in FIG. 8 for p-polarized light.
Figure 14:
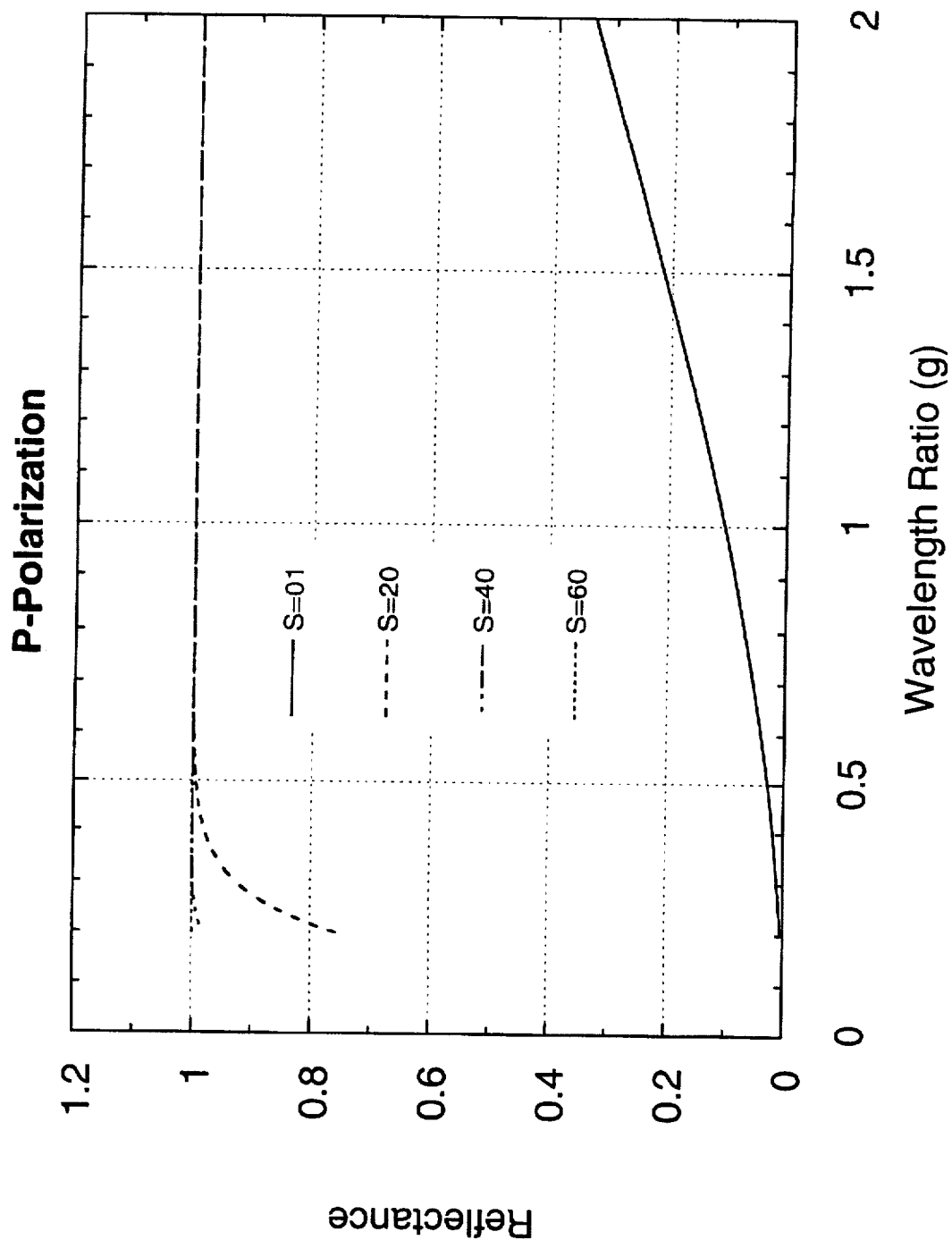
FIG. 14 shows the calculated reflectance curves for p-polarized light as a function of wavelength ratio for the same thin film systems as shown in FIG. 12. The angle of incidence $\theta_0$ is 57.3°.
Figure 15:
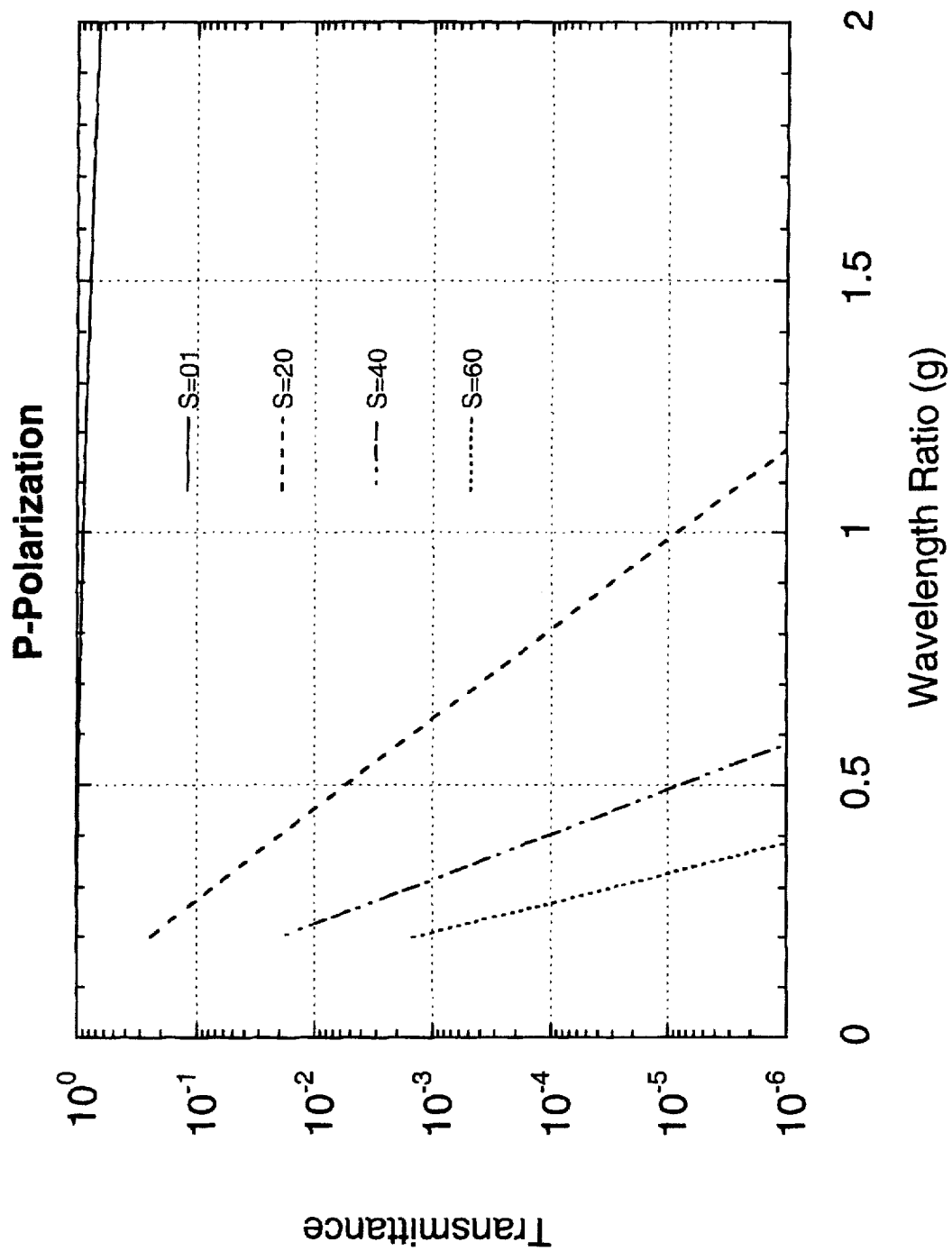
FIG. 15 shows the calculated transmittance curves for p-polarized light as a function of wavelength ratio for the same thin film systems as shown in FIG. 12. The angle of incidence $\theta_0$ is 57.3°.

As shown in FIG. 10, the equivalent optical admittance for the p-polarized light has only real part and it is different from the optical admittance of the substrate. Therefore, some of the p-polarized light will be reflected and the rest will be transmitted as shown in FIGS. 14 and 15 respectively. The equivalent phase thickness $\Gamma$ has only positive imaginary part (FIG. 11), Hence, the whole thin film structure acts like a amplitude attenuator for the p-polarized light. The transmittance or reflectance for p-polarized light will depend strongly on the number of periods S or the equivalent phase thickness of S*$\Gamma$, the imaginary part of the equivalent phase thickness $\Gamma$ as well as on the wavelength $\lambda$. The larger S or the shorter the wavelength is, the smaller the transmittance for p-polarized light is. It is possible to achieve almost any decree of attenuation in transmission for the p-polarized light by increasing S as shown in FIG. 15.

The calculated reflectance for s-polarized light and transmittance for p-polarized light are also plotted in FIGS. 16 and 17, respectively, for different angles of incidence $\theta_0$. In this case, the number of periods S was fixed to 40.

Clearly, the above thin film system acts as a very good polarizing beam-splitter over a very broad spectral region $0.2 < g = \lambda_0/\lambda < 2$ and a very wide range of angles of incidence from 50° to 70° measured within the substrate. The highs to low wavelength ratio is about 10 and the equivalent angular field in air is ±24°. By comparison, a typical thin film MacNeille polarizer has a wavelength ratio of 2 and an angular field of ±3° in air.

Thus, in accordance with the present invention, a thin film system having S periods of such a basic thin film structure can be used as a novel broad-band and wide-angle polarizing device. It can be used for separating s-polarized and p-polarized light by transmitting s-polarized light and reflecting p-polarized light. This is contrary to a conventional thin film plate polarizer or a MacNeille polarizing beam-splitter that reflects s-polarized light and transmits p-polarized light.

Although the above explanations are based on a simple three layer basic structure, clearly, without departing from the spirit and scope of the present invention, the basic structure can be extended to consist of more than three layers of alternate high and low refractive index layers as shown as in FIG. 18. The basic thin film structure 186 has (2L-1) alternatively low and high refractive index layers and the layers are embedded between two identical substrates 180 and 189. Clearly, the analysis and equations described for the three-layer basic structure in the above section call also be equally applied to the thin film structure described in FIG. 18. Apparently, the center three layers 182 can be replaced by a single equivalent layer $EQ_1$. This equivalent layer $EQ_1$ together with the adjacent two layers marked as 184 in turn can be replaced by another equivalent layer $EQ_2$. Repeating the same process, the whole thin film structure 186 can finally be replaced by a single equivalent layer $EQ_{L-1}$.

The apparent advantage having more than three layers in the basic structure in accordance with the present invention is that there are more parameters to choose in order to meet the requirements for different design wavelengths or angles of incidence. According to Eq. (10), if the equivalent optical admittance of the equivalent layer $EQ_{L-1}$ is equal to the optical admittance of the substrate, all the s-polarized light will be transmitted while some of p-polarized light will be reflected. By increasing the number of periods in the basic structure, all the p-polarized light can be reflected. If the refractive indices in the basic structure are fixed and the layer thicknesses are allowed to vary, there will be (2L-1) variables and only one equation to solve. Therefore, there will be much more freedom to choose the layer thicknesses to meet additional requirements. Thus, much wider bandwidth or wider angular field thin film polarizing device can be obtained.

To illustrate the above principle, a thin film polarizing device having five layers in the basic structure ($n_0$/aL/bH/cL/bH/aL/$n_0$) has been designed. Here, a, b and c stand for the optical thicknesses of the layers, and $n_0=2.35$, $n_L=1.45$, $n_H=4.0$. The original design wavelength is 4 μm and the angle of incidence is 57.3°. The optical thicknesses a, b and c were calculated to be 11.8 nm, 10.6 nm and 41.8 nm, respectively. The calculated reflectance and transmittance curves are plotted as a function of the wavelength ratio in FIGS. 19 and 20 respectively. The thin film polarizing devices are shown with 1, 50 or 100 periods of the basic structure. The calculated reflectance and transmittance curves at different angles of incidence are also plotted in FIGS. 21 and 22 for the case with S=100. Clearly, the thin film polarizing device is effective over a very broad band of wavelengths. For the thin film polarizing device having 100 basic structures, the high to low wavelength ratio is as large as 50:1. The highest reflectance for s-polarized light is less than $3 \times 10^{-5}$ and the highest transmittance for p-polarized light is about $1 \times 10^{-1}$ at g=0.02 for angles of incidence between 50° to 60°. This highest value of transmittance for p-polarized light can be reduced by increasing the number of periods while the reflectance for s-polarized light will be essentially the same.

In addition, without departing from the spirit and scope of the present invention, it is understood that each low refractive index layer in the basic structure can be replaced by a number of low refractive index layers having different refractive indices and each high index layer can be replaced by a number of high refractive index layers providing the critical angle condition is satisfied for each of the low refractive index layers. In addition, the performance of the initial thin film polarizing device based on the above symmetrical thin film structure can be further improved with the assistance of a computer optimization program wherein the layer thickness of each layer in the thin film system will be optimized. In the optimization process, the dispersion of the refractive indices can be taken into account. It is also possible to have two substrates having different refractive indices providing the critical angle condition is satisfied for the substrate having the lower refractive index. Normally, after the optimization procedure, the thin film system will not retain the symmetrical structure any more unless special steps are taken.

In principle, it is always possible to design a thin film polarizing device having a multilayer shown in FIG. 18, providing that the angle $\theta_0$ is larger than the critical angle for low refractive index layers ($n_{L,n0} < n_H$). However, the phase dispersion is very large when the angle of incidence is close to the critical angle. Thus, in practice, it is easier to design wide angle thin film polarizing devices in accordance with the present invention when the angle of incidence is not that close to the critical angle. In addition, the phase dispersion is large when the refractive index ratio $n_H/n_L$ is small. This is particularly the case in the visible part of the spectrum because there the highest available refractive index ratio is about 1.75. In the infrared the refractive index ratio is of the order of 4.0. For this reason infrared broad band and wide angle polarizer s have a much better performance than corresponding visible thin film polarizing devices.

In general, a novel thin film polarizing device in accordance with the present invention, as shown in FIG. 23, is comprised of first and second light transmissive substrates 230 and 231, and a plurality of thin film layers 238 disposed between the first and second light transmissive substrates. The thin film layers 238 consist of alternating high refractive index layers 233, 235, etc., and low refractive index layers 232, 234, etc. Each high refractive index layer can include a number of high refractive index sub-layers 237, 229 etc., having one or more different refractive indices, and each low refractive index layer can include a number of low refractive index sub-layers 236, 228, etc., each having one or more different refractive indices. The first and second light transmissive substrates, each in the form of a prism, have a refractive index that is greater than the refractive index of each of the low refractive index layers. The thicknesses of the low refractive index layers of the plurality of thin film layers are small enough so that light incident upon the thin film layers at an angle greater than the critical angle can be partially coupled out through the low refractive index layers so that frustrated total internal reflection occurs. This permits interference to take place between the light reflected at the interfaces of the all thin film layers. In addition, the thicknesses of the thin film layers are such that the admittance of the plurality of the thin film layers for s-polarized light is substantially the same as the optical admittance of the substrate for s-polarized light for a wide range of angles of incidence and a broad band of wavelengths when the incident light is incident upon the low refractive index layers at an angle greater that the critical angle. This permits substantially all incident s-polarized light to be substantially transmitted. The plurality of the thin film layers have an admittance for p-polarized light that is substantially different from the optical admittance of the substrate for p-polarized light for a wide-range of angles of incidence and a broadband of wavelengths and thus they substantially reflect incident p-polarized light. The prism is shaped in such a manner as to allow the incident light to be incident upon the thin film layers at a plurality of angles greater than or equal to the critical angle for the highest refractive index of the low refractive index layers.

FIGS. 24, 25, 26 and 27 represent cross-sectional views of four arrangements for the thin film polarizing devices in accordance with the present invention. The multilayer thin film coatings are embedded between two prisms, the shapes of the prisms are selected in order to make the angle of incidence of the incident light at the hypotenuse larger than the critical angle for the low index layers. The two prisms could be made of the same material. In the arrangement shown in FIG. 24, the shapes of the two prisms 240 and 244 are identical and the thin film coating 246 is deposited at the hypotenuse interface. The thin film polarizing device acts as a transmissive polarizer. Only the transmitted s-polarized light is used and the reflected p-polarized light is absorbed by a light absorber 246. In the arrangement shown in FIG. 25, the shapes of the two prisms 250 and 254 are different. The thin film coating 252 is also deposited at the hypotenuse interface. The thin film polarizing device is also configured as a reflective polarizer and only the reflected p-polarized light is used. The transmitted s-polarized light is absorbed by a light absorber 256. In the arrangements shown in FIGS. 26 and 27, both devices are configured as polarizing beamsplitters. Therefore, the reflected p-polarized light and the transmitted s-polarized are both used. In the arrangement in FIG. 26, the two prisms 260 and 264 have different shapes while in the arrangement in FIG. 27 the prisms 270 and 274 are identical. Thin film layers 262 are disposed between 260 and 264. The advantage of this latter arrangement is that the unpolarized beam can be incident on either top-sides of the device. In fact, if a symmetrical layer system solution is found for the thin film coating 272, the light can be incident on any of the four sides of the prism arrangement.

Although the two prism substrates can have different refractive indices, normally in practice, they are made of the same material in order to reduce manufacturing costs. The two prisms may be joined together in various ways. For example, they can be joined together with optical cements that have refractive indices matching the refractive index of the substrate. They can also be joined with a liquid that has a refractive index matching the refractive index of the substrate and the out-most edges of the two contact faces of the two prisms are then sealed. The two prisms, with coatings on one or both prisms, can also be brought together by using optical contact. This technique has been successfully developed for the construction of high laser damage threshold polarizers.

Several embodiments of the thin film polarizing devices in accordance with the present invention have been obtained. Five thin film coatings for these embodiments have been designed using the design principles outlined above. Each layer thickness has been optimized for the design angles and wavelengths. The coatings IR-1 IR-2 and IR-3 were designed for infrared film polarizing devices with wavelength region of 2–20 μm, 2–10 μm and 2–3.3 μm. The other two coatings VIS-1 and VIS-2, were designed for visible thin film polarizing, devices with wavelength region of 0.4–0.8 μm. Table 1 and table 2 summarize the layer systems and calculated results of these five thin film coatings. For the infrared thin film polarizing devices, substrates with refractive indices of 3.40 and 2.35 and coating materials having refractive indices of 1.45 and 4.0 were selected. For the visible thin film polarizing devices, substrates with refractive indices of 1.75 and 1.85 and coating materials having refractive indices of 1.38 and 2.35 were selected. Plots of the spectral performances of these thin film coatings IR-1, IR-2, IR-3, VIS-1 and VIS-2 at different angles of incidence are given in FIGS. 28 and 29 (IR-1) FIGS. 30 and 31 (IR-2), FIGS. 32 and 33 (IR-3), FIGS. 34 and 35 (VIS-1), and FIGS. 36 and 37 (VIS-2), for s-polarized and p-polarized, respectively.

Clearly, in terms of band-width, angular field and extinction ratios, all five embodiments are significantly better than conventional thin film polarizers or polarizing beamsplitters. For the infrared thin film polarizing devices, the wavelength ratios are 10:1, 5:1 and 1.65:1 while the angular fields in air are ±36°, ±61° and ±30°. The minimum extinction ratios for the reflected and transmitted light are $9 \times 10^{-5}$:1 and $3 \times 10^{-4}$:1 (IR-1), $9 \times 10^{-5}$:1 and $2 \times 10^{-4}$:1 (IR-2), and $7 \times 10^{-5}$:1 and $9 \times 10^{-5}$:1 (IR-3). For the visible thin film polarizing devices, the wavelength ratios are 2:1 and 1.5:1 while the angular fields in air are ±11.4° and ±15.8°. The minimum extinction ratios for the reflected and transmitted light are $1 \times 10^{-4}$:1 and $1.5 \times 10^{-4}$:1 (VIS-1), $1.5 \times 10^{-4}$:1 and $1 \times 10^{-4}$:1 (VIS-2). The performance of the infrared polarizers is much better than that of the visible polarizers because the available refractive index ratio is much higher.

An error analysis has shown that random errors of the order of ±1 or ±2% in the thicknesses of the layers of polarizers of this type will not unduly affect the performance of the devices. This, of course, relaxes the manufacturing tolerances for these devices.

Because the thin film polarizing devices in accordance with the present invention are based on frustrated total internal reflection, the layer thicknesses are a fraction of the mean wavelength of the designed spectral region. Hence, the layers are very thin compared to those of conventional thin film polarizers and thus it should be less costly to manufacture such systems. This is especially important in the case of far infrared polarizers where normally the total layer thicknesses are very thick and require a very long deposition time.

The thin film coatings in the thin film polarizing devices in accordance with the present invention can be manufactured by conventional physical or chemical thin film deposition techniques, such as thermal evaporation, sputtering, ion-plating and plasma assisted evaporation. Those process can produce good quality thin films. Since no absorbing coating materials are used in the thin film systems, the thin film polarizing devices are very durable both physically and chemically.

The novel thin film polarizing devices in accordance with the present invention are very broad-band and are effective over a very wide range of angles. By controlling the layer thicknesses, the extinction ratio in transmitted light can assume almost any value. The extinction ratio in reflected light is also very high when compared to that of conventional thin film polarizers. If necessary, another polarizing device of the same type can be placed in series to obtain an even higher extinction ratio. The novel thin film polarizing devices can be used in almost all applications where current polarizers or polarizing beam-splitters are used. For example, in the visible and near infrared spectral regions, the novel thin film polarizing devices in accordance with this invention can be used to replace more expensive polarizing devices based on birefringent crystals. In the infrared and far infrared regions they can replace metal grid polarizers.

Furthermore, because the performance of the thin film polarizing device in accordance with this invention is much better than that of the conventional devices, and because they can be fabricated relatively inexpensively using conventional deposition processes, they should be desirable for use in new applications.

Numerous other embodiments of the invention may be obtained without departing, from the spirit and scope of the invention. For example, novel thin film polarizing devices for other parts of the spectrum such as ultraviolet, far-infrared and microwave regions, can be obtained as well. In addition, other prism materials and coating, materials can be used also. In the infrared, the prism material may be made of ZnS, ZnSe, Si, Ge, etc. In the visible, the substrates may be made of various glasses and various plastics. The coating materials can be selected from the common materials used in conventional thin film coatings, such as $MgF_2$, $ThF_4$, $SiO_2$, $Al_2O_3$, $ZrO_2$, $TiO_2$, $Ta_2O_5$, $Nb_2O_5$, Si, ZnS, ZnSe, Si, Ge, etc.

TABLE 1

| Layer System | IR-1 Index | IR-1 Optical Thickness | IR-2 Index | IR-2 Optical Thickness | IR-3 Index | IR-3 Optical Thickness | VIS-1 Index | VIS-1 Optical Thickness | VIS-2 Index | VIS-2 Optical Thickness |
|---|---|---|---|---|---|---|---|---|---|---|
| Substrate | 3.40 | — | 3.40 | | 2.35 | | 1.75 | | 1.85 | |
| 1 | 4.00 | 0.22578 | 4.00 | 0.14706 | 4.00 | 0.05998 | 2.35 | 0.02130 | 2.35 | 0.02416 |
| 2 | 1.45 | 0.08030 | 1.45 | 0.05321 | 1.45 | 0.13894 | 1.38 | 0.06141 | 1.38 | 0.04173 |
| 3 | 4.00 | 0.49979 | 4.00 | 0.31092 | 4.00 | 0.10741 | 2.35 | 0.04803 | 2.35 | 0.04572 |
| 4 | 1.45 | 0.08488 | 1.45 | 0.04448 | 1.45 | 0.10168 | 1.38 | 0.04837 | 1.38 | 0.03141 |
| 5 | 4.00 | 0.58963 | 4.00 | 0.25952 | 4.00 | 0.09595 | 2.35 | 0.03726 | 2.35 | 0.04035 |
| 6 | 1.45 | 0.12156 | 1.45 | 0.04992 | 1.45 | 0.10089 | 1.38 | 0.04411 | 1.38 | 0.03212 |
| 7 | 4.00 | 0.79150 | 4.00 | 0.28166 | 4.00 | 0.09289 | 2.35 | 0.04056 | 2.35 | 0.04106 |
| 8 | 1.45 | 0.14523 | 1.45 | 0.04655 | 1.45 | 0.10606 | 1.38 | 0.08092 | 1.38 | 0.03683 |
| 9 | 4.00 | 0.86898 | 4.00 | 0.36640 | 4.00 | 0.09797 | 2.35 | 0.06740 | 2.35 | 0.04764 |
| 10 | 1.45 | 0.15123 | 1.45 | 0.07840 | 1.45 | 0.11778 | 1.38 | 0.06330 | 1.38 | 0.04282 |
| 11 | 4.00 | 0.89080 | 4.00 | 0.45189 | 4.00 | 0.10739 | 2.35 | 0.04811 | 2.35 | 0.05626 |
| 12 | 1.45 | 0.15269 | 1.45 | 0.07159 | 1.45 | 0.13423 | 1.38 | 0.09412 | 1.38 | 0.05384 |
| 13 | 4.00 | 0.89134 | 4.00 | 0.46388 | 4.00 | 0.12774 | 2.35 | 0.07832 | 2.35 | 0.07597 |
| 14 | 1.45 | 0.15142 | 1.45 | 0.09315 | 1.45 | 0.14925 | 1.38 | 0.09155 | 1.38 | 0.06471 |
| 15 | 4.00 | 0.87588 | 4.00 | 0.59628 | 4.00 | 0.14619 | 2.35 | 0.06574 | 2.35 | 0.07410 |
| 16 | 1.45 | 0.14758 | 1.45 | 0.10721 | 1.45 | 0.16595 | 1.38 | 0.10450 | 1.38 | 0.06698 |
| 17 | 4.00 | 0.85088 | 4.00 | 0.63970 | 4.00 | 0.14056 | 2.35 | 0.08337 | 2.35 | 0.09217 |
| 18 | 1.45 | 0.14330 | 1.45 | 0.11343 | 1.45 | 0.16090 | 1.38 | 0.09592 | 1.38 | 0.08495 |
| 19 | 4.00 | 0.83675 | 4.00 | 0.68908 | 4.00 | 0.14119 | 2.35 | 0.05371 | 2.35 | 0.10230 |
| 20 | 1.45 | 0.14319 | 1.45 | 0.12269 | 1.45 | 0.15496 | 1.38 | 0.08508 | 1.38 | 0.09080 |
| 21 | 4.00 | 0.84644 | 4.00 | 0.73301 | 4.00 | 0.14329 | 2.35 | 0.08180 | 2.35 | 0.11053 |
| 22 | 1.45 | 0.14629 | 1.45 | 0.12848 | 1.45 | 0.16431 | 1.38 | 0.10924 | 1.38 | 0.09955 |
| 23 | 4.00 | 0.86039 | 4.00 | 0.76080 | 4.00 | 0.14280 | 2.35 | 0.05450 | 2.35 | 0.11664 |
| 24 | 1.45 | 0.14797 | 1.45 | 0.13256 | 1.45 | 0.16560 | 1.38 | 0.06542 | 1.38 | 0.10209 |
| 25 | 4.00 | 0.86089 | 4.00 | 0.78337 | 4.00 | 0.14413 | 2.35 | 0.07034 | 2.35 | 0.11634 |
| 26 | 1.45 | 0.14669 | 1.45 | 0.13621 | 1.45 | 0.14764 | 1.38 | 0.11145 | 1.38 | 0.09975 |
| 27 | 4.00 | 0.84909 | 4.00 | 0.79979 | 4.00 | 0.12674 | 2.35 | 0.07357 | 2.35 | 0.11266 |
| 28 | 1.45 | 0.14412 | 1.45 | 0.13830 | 1.45 | 0.13309 | 1.38 | 0.08699 | 1.38 | 0.09466 |
| 29 | 4.00 | 0.83430 | 4.00 | 0.80481 | 4.00 | 0.10741 | 2.35 | 0.06196 | 2.35 | 0.10495 |
| 30 | 1.45 | 0.14162 | 1.45 | 0.13791 | 1.45 | 0.11793 | 1.38 | 0.09179 | 1.38 | 0.08514 |
| 31 | 4.00 | 0.82066 | 4.00 | 0.79410 | 4.00 | 0.09796 | 2.35 | 0.07525 | 2.35 | 0.09599 |
| 32 | 1.45 | 0.13924 | 1.45 | 0.13465 | 1.45 | 0.10679 | 1.38 | 0.10320 | 1.38 | 0.07935 |
| 33 | 4.00 | 0.81317 | 4.00 | 0.76543 | 4.00 | 0.09390 | 2.35 | 0.06833 | 2.35 | 0.08724 |
| 34 | 1.45 | 0.13911 | 1.45 | 0.12818 | 1.45 | 0.10117 | 1.38 | 0.08571 | 1.38 | 0.06432 |
| 35 | 4.00 | 0.82587 | 4.00 | 0.71779 | 4.00 | 0.09565 | 2.35 | 0.07080 | 2.35 | 0.07149 |
| 36 | 1.45 | 0.14335 | 1.45 | 0.11807 | 1.45 | 0.10277 | 1.38 | 0.09854 | 1.38 | 0.06114 |
| 37 | 4.00 | 0.85372 | 4.00 | 0.64448 | 4.00 | 0.10813 | 2.35 | 0.06671 | 2.35 | 0.07145 |
| 38 | 1.45 | 0.14828 | 1.45 | 0.10233 | 1.45 | 0.13800 | 1.38 | 0.08146 | 1.38 | 0.05282 |
| 39 | 4.00 | 0.87568 | 4.00 | 0.55285 | 4.00 | 0.05938 | 2.35 | 0.06531 | 2.35 | 0.05736 |
| 40 | 1.45 | 0.15069 | 1.45 | 0.08872 | | | 1.38 | 0.07740 | 1.38 | 0.04199 |
| 41 | 4.00 | 0.88116 | 4.00 | 0.48131 | | | 2.35 | 0.04478 | 2.35 | 0.04609 |
| 42 | 1.45 | 0.15007 | 1.45 | 0.07204 | | | 1.38 | 0.05289 | 1.38 | 0.03636 |
| 43 | 4.00 | 0.86132 | 4.00 | 0.37041 | | | 2.35 | 0.03936 | 2.35 | 0.03888 |
| 44 | 1.45 | 0.14400 | 1.45 | 0.05913 | | | 1.38 | 0.04438 | 1.38 | 0.03069 |
| 45 | 4.00 | 0.78214 | 4.00 | 0.31842 | | | 2.35 | 0.04735 | 2.35 | 0.03913 |
| 46 | 1.45 | 0.11956 | 1.45 | 0.04978 | | | 1.38 | 0.06646 | 1.38 | 0.03037 |
| 47 | 4.00 | 0.58577 | 4.00 | 0.33241 | | | 2.35 | 0.02366 | 2.35 | 0.04615 |
| 48 | 1.45 | 0.08642 | 1.45 | 0.05882 | | | | | 1.38 | 0.04232 |
| 49 | 4.00 | 0.50942 | 4.00 | 0.16599 | | | | | 2.35 | 0.02410 |
| 50 | 1.45 | 0.08104 | | | | | | | | |
| 51 | 4.00 | 0.22647 | | | | | | | | |
| Substrate | 3.40 | — | 3.40 | — | 2.35 | — | 1.75 | — | 1.85 | — |

TABLE 1-continued

| Layer System | IR-1 | | IR-2 | | IR-3 | | VIS-1 | | VIS-2 | |
|---|---|---|---|---|---|---|---|---|---|---|
| | Index | Optical Thickness | Index | Optical Thickness | Index | Optical Thickness | Index | Optical Thickness | Index | Optical Thickness |
| Total Optical Thickness | | 22.9577 | | 15.4972 | | 4.7446 | | 3.2317 | | 3.2055 |

TABLE 2

| Embodiments | IR-1 | IR-2 | IR-3 | VIS-1 | VIS-2 |
|---|---|---|---|---|---|
| Indices of Substrates | 3.40 | 3.40 | 2.35 | 1.75 | 1.85 |
| Indices of Coating Materials | 1.45, 4.00 | 1.45, 4.00 | 1.45, 4.00 | 1.38, 2.35 | 1.38, 2.35 |
| No. of Layers | 51 | 49 | 39 | 47 | 49 |
| Total Optical Thickness ($\mu$m) | 22.9577 | 15.4972 | 4.7446 | 3.2317 | 3.2055 |
| Angular Field in Prism | 52–72° | 47°–77° | 52°–77° | 64°–77° | 63°–80° |
| Angular Field in air | ±36° | ±61° | ±30° | ±11.4° | ±15.8° |
| Wavelength Range ($\mu$m) | 2–20 | 2–10 | 2–3.3 | 0.4–0.8 | 0.4–0.8 |
| Max. Reflectance for S-polarization | $9 \times 10^{-5}$ | $9 \times 10^{-5}$ | $7 \times 10^{-5}$ | $1 \times 10^{-4}$ | $1.5 \times 10^{-4}$ |
| Min Extinction Ratio for Reflected Light | $9 \times 10^{-5}:1$ | $9 \times 10^{-5}:1$ | $7 \times 10^{-5}:1$ | $1 \times 10^{-4}:1$ | $1.5 \times 10^{-4}:1$ |
| Min Transmittance for P-polarization | $3 \times 10^{-4}$ | $2 \times 10^{-4}$ | $9 \times 10^{-5}$ | $1.5 \times 10^{-4}$ | $1 \times 10^{-4}$ |
| Min Extinction Ratio for Transmitted Light | $3 \times 10^{-4}:1$ | $2 \times 10^{-4}:1$ | $9 \times 10^{-5}:1$ | $1.5 \times 10^{-4}:1$ | $1 \times 10^{-4}:1$ |

What we claim is:

1. A thin film polarizing device comprising:
first and second light transmissive substrates; and,
a plurality of thin film layers having refractive indices that range between low and high values, disposed between the first and second light transmissive substrates, the substrates having refractive indices that are higher than the index of the lowest refractive index layer, so that incident light falls upon some of the lower refractive index layers at an angle that is greater than the critical angle, the number of the thin film layers and their thicknesses and refractive indices being chosen to allow unpolarized incident light to be separated into s-polarized and p-polarized light beams;
wherein frustrated total internal reflection and thin film interference are simultaneously employed to allow s-polarized light to be transmitted and p-polarized light to be reflected over a wide range of wavelengths and angles of incidence.

2. A thin film polarizing device as defined in claim 1, wherein the thin film layers comprise high refractive index layers and low refractive index layers, the high refractive index layers having one or more different refractive indices, and the low refractive index layers having one or more different refractive indices wherein the wide range of angles of incidence incident upon the thin film layers is between the critical angle of the low refractive index layers and 90°.

3. A thin film polarizing device as defined in claim 2, wherein the low refractive index layers perform the function of light intensity attenuators while the high refractive index layers perform the function of phase adjusters.

4. A thin film polarizing device as defined in claim 2, wherein the low refractive index layers and the high refractive index layers are substantially light transmissive.

5. A thin film polarizing device as defined in claim 2, wherein the optical thicknesses of the low refractive index layers are less than a wavelength of the light at a central operating wavelength.

6. A thin film polarizing device as defined in claim 2, wherein the wide range of wavelengths includes the ultraviolet spectrum of the light to the far infrared spectrum of the light.

7. A thin film polarizing device as defined in claim 2, wherein the ratio of the substrate and the highest of the low refractive index layers is greater than 1.0.

8. A thin film polarizing device as defined in claim 2, wherein the device is a polarizing beam splitter.

9. A thin film polarizing device as defined in claim 1, wherein the device is a polarization beam splitter.

10. A thin film polarizing device, for separating s-polarized light and p-polarized light by reflecting p-polarized light and transmitting s-polarized light comprising:

first and second light transmissive substrates; and,
a plurality of thin film layers disposed between the first and second light transmissive substrates;
the thin film layers comprising high refractive index layers and low refractive index layers, the high refractive index layers having one or more different refractive indices, and the low refractive index layers having one or more different refractive indices;
the first and second light transmissive substrates, each in the form of a prism having a refractive index greater than the refractive index of each of the low refractive index layers;
the prisms being shaped in such a manner as to allow incident light to be incident upon the thin film layers at a plurality of angles greater than or equal to the critical angle for the highest refractive index of the low refractive index layers;
the thickness of the low refractive index layers of the plurality of thin film layers being small enough so that light incident upon the thin film layers at an angle greater than the critical angle can be partially coupled out through the low refractive index layers such that frustrated total internal reflection occurs, thus permitting interference to take place between light reflected at the interfaces of all the thin film layers;

and in addition, the thicknesses of the thin film layers being such that an equivalent optical admittance of the plurality of the thin film layers for s-polarized light is substantially the same as an optical admittance of the substrate for s-polarized light for a wide range of angles of incidence and a broad band of wavelengths when the incident light is incident upon the low refractive index layers at an angle greater that the critical angle, thereby allowing substantially all incident s-polarized light to be substantially transmitted;

the plurality of the thin film layers having an equivalent optical admittance for p-polarized light that is substantially different from the optical admittance of the substrate for p-polarized light for a wide-range of angles of incidence and a broad-band of wavelengths and thus substantially reflecting incident p-polarized light.

11. A thin film polarizing device as defined in claim 10, wherein the wide range of angles of incidence incident upon the thin film layers is between the critical angle of the low refractive index layers and 90°.

12. A thin film polarizing device as defined in claim 10, wherein the low refractive index layers perform the function of light intensity attenuators while the high refractive index layers perform the function of phase adjusters.

13. A thin film polarizing device as defined in claim 10, wherein the low refractive index layers and the high refractive index layers are substantially light transmissive.

14. A thin film polarizing device as defined in claim 10, wherein the optical thicknesses of the low refractive index layers are less than a wavelength of the light at a central operating wavelength.

15. A thin film polarizing device as defined in claim 10, wherein the broad band of wavelengths include the ultraviolet, visible, infrared, far-infrared and microwave spectrum of the light.

16. A thin film polarizing device as defined in claim 10 wherein a refractive index ratio of the substrate and the highest of the low refractive index layers is greater than 1.0.

17. A polarizing device for separating s-polarized light and p-polarized light through either reflecting p-polarized light or transmitting s-polarized light comprising:

a first and a second substrates at least the first being light transmissive;

and, a plurality of thin film layers disposed between the first and second substrates;

the thin film layers comprising high refractive index layers and low refractive index layers, high refractive index layers having one or more different refractive indices, and the low refractive index layers having one or more different refractive indices;

the first and second substrates, each in the form of a prism having a refractive index greater than the refractive index of each of the low refractive index layers;

the prisms being shaped in such a manner as to allow incident light to be incident upon the thin film layers at a plurality of angles greater than or equal to the critical angle for the highest refractive index of the low refractive index layers;

the thickness of the low refractive index layers of the plurality of thin film layers being small enough so that light incident upon the thin film layers at an angle greater than the critical angle can be partially coupled out through the low refractive index layers such that frustrated total internal reflection occurs, thus permitting interference to take place between light reflected at the interfaces of the all thin film layers;

and in addition, the thicknesses of the thin film layers being such that an equivalent optical admittance of the plurality of the thin film layers for s-polarized light is substantially the same as an optical admittance of the substrate for s-polarized light for a wide-range of angles of incidence and a broad-band of wavelengths when the incident light is incident upon the low refractive index layers at an angle greater that the critical angle, thereby allowing substantially all incident s-polarized light to be substantially transmitted;

the plurality of the thin film layers having an equivalent optical admittance for p-polarized light that is substantially different from the optical admittance of the substrate for p-polarized light for a wide-range of angles of incidence and a broad-band of wavelengths and thus substantially reflecting all incident p-polarized light.

* * * * *